United States Patent
Lopez et al.

(10) Patent No.: US 12,017,668 B1
(45) Date of Patent: Jun. 25, 2024

(54) LIMITED VEHICULAR OPERATION WITH A FAULTED COMPONENT

(71) Applicant: Zoox, Inc., Foster City, CA (US)

(72) Inventors: Matthew Daniel Lopez, Morgan Hill, CA (US); Collin MacGregor, Foster City, CA (US); Udayan Pushparaj Karmarkar, Sunnyvale, CA (US); Lilith Rogue Automata, San Francisco, CA (US); Ganapathy Sankararaman, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 65 days.

(21) Appl. No.: 17/489,142

(22) Filed: Sep. 29, 2021

(51) Int. Cl.
| | |
|---|---|
| *B60W 50/029* | (2012.01) |
| *B60W 50/00* | (2006.01) |
| *B60W 50/02* | (2012.01) |
| *B60W 50/08* | (2020.01) |
| *B60W 60/00* | (2020.01) |

(52) U.S. Cl.
CPC ...... *B60W 50/029* (2013.01); *B60W 50/0205* (2013.01); *B60W 50/082* (2013.01); *B60W 60/0015* (2020.02); *B60W 2050/0054* (2013.01); *B60W 2050/007* (2013.01); *B60W 2050/021* (2013.01)

(58) Field of Classification Search
CPC ........... B60W 50/029; B60W 60/0015; B60W 50/0205; B60W 50/082; B60W 2050/0054; B60W 2050/007; B60W 2050/021
See application file for complete search history.

(56) References Cited

U.S. PATENT DOCUMENTS

| | | | |
|---|---|---|---|
| 9,364,178 B2 | 6/2016 | Duncan et al. | |
| 9,406,177 B2 | 8/2016 | Attard et al. | |

(Continued)

FOREIGN PATENT DOCUMENTS

| | | |
|---|---|---|
| CA | 3010882 A1 | 7/2017 |
| CN | 112441005 A | 3/2021 |

(Continued)

OTHER PUBLICATIONS

Office Action for U.S. Appl. No. 17/489,191, mailed on May 3, 2023, Lopez, "Manual Operation Vehicle Constraints", 16 Pages.

(Continued)

*Primary Examiner* — Jaime Figueroa
*Assistant Examiner* — Jamal A Shah
(74) *Attorney, Agent, or Firm* — Lee & Hayes, P.C.

(57) ABSTRACT

Techniques for enabling operation of a vehicle after detecting a fault associated with a component of the vehicle are described herein. A vehicle computing system can monitor components of the vehicle and identify a fault associated with a component. Based on the fault, the vehicle computing system can cause the vehicle to cease (e.g., stop) or limit operation in an environment. The vehicle computing system can receive a request to override the fault and continue operation of the vehicle in a recovery mode with limited parameters (e.g., limited speed, acceleration, etc.). Based on a determination that the request to override the fault is valid, the vehicle computing system can cause the vehicle to be controlled, by an operator or an autonomous controller, according to parameters of the recovery mode.

20 Claims, 9 Drawing Sheets

(56) References Cited

U.S. PATENT DOCUMENTS

| | | |
|---|---|---|
| 9,792,656 B1 | 10/2017 | Konrardy et al. |
| 10,137,903 B2 | 11/2018 | Tascione et al. |
| 10,338,594 B2 | 7/2019 | Long |
| 10,410,747 B2 | 9/2019 | Matos |
| 10,424,135 B2 | 9/2019 | Poeppel et al. |
| 11,180,156 B2 | 11/2021 | Lopez et al. |
| 11,307,585 B2 | 4/2022 | Basich et al. |
| 11,351,873 B2 | 6/2022 | Degand et al. |
| 2008/0074247 A1 | 3/2008 | Plantamura |
| 2012/0046817 A1 | 2/2012 | Kindo et al. |
| 2015/0149021 A1 | 5/2015 | Duncan et al. |
| 2015/0178998 A1 | 6/2015 | Attard et al. |
| 2016/0272220 A1* | 9/2016 | Ichikawa ............... B60W 20/10 |
| 2017/0185082 A1 | 6/2017 | Matos |
| 2018/0147721 A1 | 5/2018 | Griffin et al. |
| 2018/0164813 A1 | 6/2018 | Poeppel et al. |
| 2018/0365908 A1 | 12/2018 | Liu et al. |
| 2019/0171205 A1* | 6/2019 | Kudanowski ......... B60W 10/04 |
| 2019/0220026 A1 | 7/2019 | Vawter et al. |
| 2020/0377078 A1* | 12/2020 | Liu .................. B60W 60/00186 |
| 2021/0070315 A1 | 3/2021 | Thompson et al. |
| 2021/0132606 A1 | 5/2021 | Basich et al. |
| 2021/0179127 A1 | 6/2021 | Lopez et al. |
| 2021/0347371 A1* | 11/2021 | Lee .................... B60W 50/029 |
| 2022/0234611 A1 | 7/2022 | Suzuki |
| 2023/0118889 A1 | 4/2023 | Horky et al. |

FOREIGN PATENT DOCUMENTS

| | | |
|---|---|---|
| DE | 102020122618 A1 | 3/2021 |
| GB | 2524393 A | 9/2015 |
| JP | 2019209714 A | 12/2019 |

OTHER PUBLICATIONS

Office Action for U.S. Appl. No. 17/489,083, mailed on Jul. 5, 2023, Lopez, "Vehicle Operating Constraints", 15 Pages.

* cited by examiner

LIMITED VEHICULAR OPERATION WITH A FAULTED COMPONENT

BACKGROUND

Vehicles are increasingly supplementing or replacing manual functionality with automatic controls. Often, vehicles configured for autonomous and/or semi-autonomous operation may include one or more controllers that are configured to monitor various hardware and software components that are used to assist in controlling the vehicle. For example, a vehicle may include a first controller that monitors a first set of components associated with detecting objects in an environment and determining a trajectory to drive based in part on the objects, and a second controller that monitors a second set of components associated with manipulating motors, wheels, and the like, to cause the vehicle to follow the trajectory. Each of the controller(s) may be configured to identify faults in related components, and cause the vehicle to be controlled based on constraints associated with the faults, such as based on a list of hard-coded fault responses. However, as the number of components and related complexity increases, it can become difficult, if not impossible, to identify and hard-code responses to every fault or combination of faults. As such, a vehicle controller may default to stopping the vehicle in situations in which faults or combinations of faults are detected, thereby halting progress of the vehicle, and limiting capabilities thereof.

Moreover, a vehicle configured for autonomous operation may additionally be configured to enable a manual operation thereof. The controllers may continuously monitor the hardware and software components, regardless of a mode of operation (e.g., autonomous mode, semi-autonomous mode, manual mode). The controller may be configured to detect a fault associated with the vehicle and cause the vehicle to stop operating based on the fault. However, when the vehicle is operating in manual mode, this automatic fault detection and reaction may unnecessarily halt progress of the vehicle and may result in a negative operator experience.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
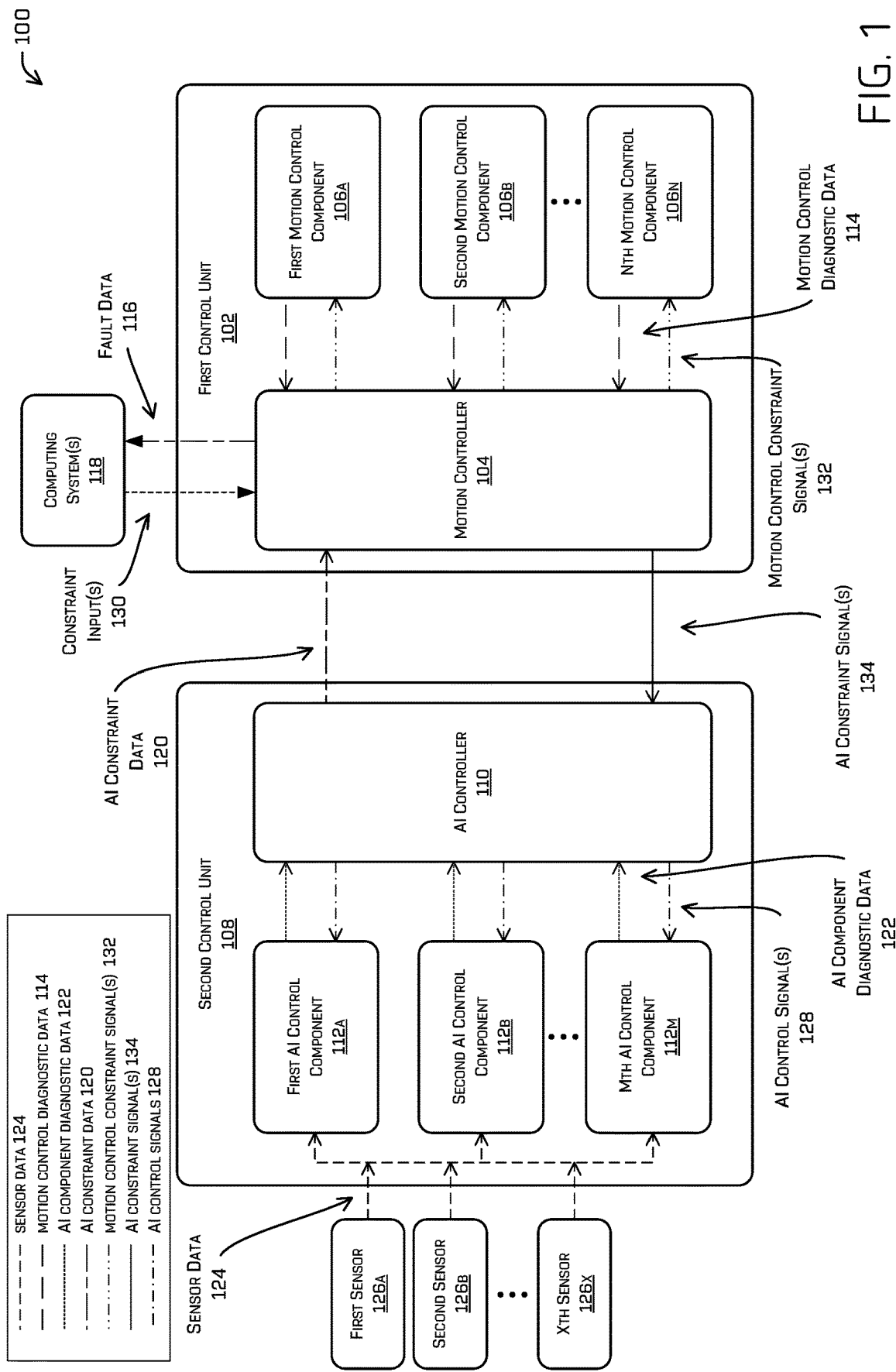
FIG. 1 is a block diagram illustrating example components of a system configured to control vehicular operation based on component diagnostics, in accordance with examples of this disclosure.

As discussed above, a vehicle configured for autonomous operation may include one or more controllers configured to monitor respective sets of components. Each of the controllers may be configured to identify faults in a respective set of components and respond to an identified fault based on a hard-coded (e.g., pre-defined) response. However, as the number of components and related complexity increases, it can become difficult, if not impossible, to identify and hard-code responses to every fault or combination of faults. As such, a vehicle controller may default to stopping the vehicle in situations in which faults or combinations of faults are detected, thereby halting progress of the vehicle, and limiting capabilities thereof.

This application relates to techniques for dynamically determining constraints (e.g., limitations or restrictions on parameters of operation (e.g., speed, acceleration, turn radius, power output, etc.)) to apply to an operation (or function) of a vehicle, such as to enable continued operation of the vehicle in a limited capacity after detection of a fault or combination of faults. As discussed above, a vehicle control system may include one or more controllers configured to monitor associated sets of components. In at least one example, a first controller may be configured to monitor a first set of components associated with autonomous operation of the vehicle and a second controller may be configured to monitor a second set of components associated with motion of the vehicle (e.g., battery systems, drive systems, etc.). In conventional systems, one or more of the controllers are configured to identify a fault with an associated component, and cause the vehicle to cease operation based on the fault. Unlike these conventional systems, the techniques described herein include providing data to a primary controller configured to process the data and identify one or more constraints to apply to an operation of the vehicle.

In at least one example, the primary controller includes a controller that is configured with safety related hardware and software, such as to ensure a safe operation of the vehicle. In such an example, the primary controller may be configured to identify constraints to be applied to the vehicle in order to optimize a safe operation thereof. In at least one example, the primary controller may be configured to monitor a set of components associated with motion of the vehicle. In such an example, a control signal generated by the primary controller may directly result in vehicular movement.

In various examples, the primary controller may be configured to receive first data from a first set of components (e.g., associated with motion of the vehicle). The first data may include diagnostics associated with the first set of components. In some examples, the diagnostics may include a state (e.g., active, inactive, faulted, etc.) of each component of the first set of components. In some examples, the diagnostics may include one or more faults associated with one or more components of the first set of components. In various examples, the primary controller may be configured to determine one or more constraints to apply to the operation of the vehicle based on the first data (e.g., the diagnostics). For example, the first data may include an indication of a fault associated with a drive system. Based on a type of fault and associated component, the primary controller may identify a constraint on the operation of the vehicle that is associated with the fault.

A constraint may include a limitation or restriction on the operation (or function) of the vehicle and/or a component thereof. As non-limiting examples, the constraint may include a limitation on speed (e.g., maximum speed), acceleration (e.g., maximum lateral and/or longitudinal acceleration), turn radius, a vehicle trajectory (e.g., right turn not authorized, etc.), a direction of travel (e.g., reverse travel disable, etc.), a drivetrain configuration of the vehicle (e.g.,), a mission of the vehicle (e.g., manual operation, autonomous operation, etc.), a power mode or voltage associated with an electric motor (e.g., standby mode, accessory power mode, high voltage power mode, etc.), a collision response system (e.g., airbag system, restraint system, active bumper system, battery connection disabled in response to collision, etc.), and/or any other limitations on the operation of the vehicle and/or systems associated therewith. In at least one example, the constraint may represent one or more components, systems, actions, and/or the like of the vehicle that are not available.

In various examples, the constraints can include limitations on one or more vehicle systems (e.g., planner component, collision avoidance system, manually assisted control, etc.) that result in a limited operation or functioning of the vehicle. In such examples, the constraints may represent absolute constraints to be followed by the vehicle (or controller thereof), such as to maintain safe operation of the vehicle. That is, the constraints can include "low-level" constraints that limit the overall movement of the vehicle operating in an environment.

In some examples, the primary controller may be configured to identify one or more constraints to apply to vehicular operation based on second data received from a secondary controller. In at least one example, the secondary controller may include a controller configured to monitor operations of a second set of components associated with autonomous operation of the vehicle. The secondary controller may be configured to receive diagnostics from the second set of components and determine one or more constraints for vehicular operation based on the diagnostics. The secondary controller may aggregate the one or more constraints, and provide aggregated constraint(s) to the primary controller as the second data. In some examples, the second data may additionally include diagnostics associated with the aggregated constraint(s). That is, the second data may include one or more aggregated constraints and the diagnostics, or characteristics, associated with one or more components of the second set of components that resulted in the constraint(s).

In various examples, the primary controller may be configured to receive the second data and validate the aggregated constraint(s) based in part on the diagnostics. In such examples, the primary controller may process a constraint of the aggregated constraint(s) and associated diagnostics (e.g., active errors, faults, operational state, etc.) to determine whether the constraint is valid. Based on a determination that the constraint is invalid, the primary controller may withhold the constraint from vehicle control considerations (e.g., component control determination). Based on a determination that the constraint is valid, the primary controller may include the constraint in vehicle control considerations.

In various examples, the primary controller may additionally receive constraints (e.g., third data) from a source external to the vehicle control system. As non-limiting examples, the external sources may include an operator or passenger of the vehicle, a remote operator (e.g., teleoperator), and/or a remote computing device configured to communicate with the vehicle control system. For example, the external source may include a remote computing device configured to monitor operations of the vehicle in an environment and, in some examples, provide constraints on an operation of the vehicle to the primary controller. For another example, the external source may include an operator of the vehicle. In such an example, the operator may input, via an interface associated with the primary controller, a constraint to apply to the operation of the vehicle.

In various examples, the primary controller may be configured to process the first data (e.g., diagnostics from the first set of components), second data (e.g., aggregated constraint(s) and diagnostics associated with the second set of components), and third data (e.g., constraints received from an external source) to identify one or more constraints to apply to vehicular operation. In various examples, the primary controller may identify a constraint to apply based on a determination that the constraint is valid and/or that no other same or similar constraints exist. That is, based on a determination that a single constraint of a particular type exists and is valid, the primary controller may determine to apply the constraint to vehicle control considerations. Continuing the example with the remote computing device configured to monitor operations of the vehicle in the environment. Based on a detection of a condition in the environment, such as a threshold amount of pedestrian traffic detected, the remote computing device may determine to limit the maximum speed of the vehicle. The remote computing device may send a constraint limiting the maximum speed of the vehicle to the primary controller. Based on a determination that no other speed constraints or related constraints are present, the primary controller may generate control signals to cause the vehicle to be operated in accordance with the constraint.

In various examples, two or more constraints determined by different sources (e.g., primary controller, secondary controller, external source, etc.) may be associated with different limitations, and thus independent of one another. That is, a first constraint and a second constraint may both be applied to vehicle control considerations, to limit vehicular operations. In such examples, the primary controller may determine to apply the two or more independent constraints to limit the operation of the vehicle. For example, the primary controller may receive a first constraint to limit the maximum speed of the vehicle, as described above, and a second constraint to limit a turn radius of the vehicle. The primary controller may generate control signals to cause the vehicle to be operated in accordance with the first constraint and the second constraint.

In some examples, two or more constraints determined by different sources may be associated with a same or similar limitation, but with different values. In such examples, the primary controller may identify a more conservative constraint of the two or more constraints to apply. For example, the primary controller may determine, based on a first fault associated with a first component, a first constraint including a first speed as a maximum speed of the vehicle to travel in an environment. The secondary controller may determine, based on a second fault associated with a second component, a second constraint including a second speed as a maximum speed of the vehicle to a travel in the environment. The primary controller determines that the first and second constraints are associated with a same or similar constraint and cannot both be applied to limit the operation of the vehicle. The primary controller identifies a lowest speed of the first speed and the second speed and applies the lowest (e.g., most conservative) speed as the constraint.

As briefly mentioned above, the primary controller may cause the vehicle to be controlled based on constraint(s) identified to be applied to vehicular operation. In various examples, the primary controller may generate control signals to send to associated components, such as to cause the vehicle to operate according to the constraint(s). In some examples, the control signal may include the constraint(s), such as to enable the component(s) to make necessary adjustments to operate within the constraint(s).

In some examples, the primary controller may be configured to determine different control signals to send to each component to ensure that the vehicle operates within the constraint(s). In such examples, the primary controller may identify one or more components associated with a constraint and generate a control signal associated with each of the one or more components. For example, a constraint may include a maximum speed. The primary controller may generate a first control signal to send to a planner component to set a first speed that is less than the maximum speed, a second control signal to send to a drive system to de-rate torque output based on a second speed that is less than the maximum speed, and a third control signal to send to a motor based on a third speed that is less than the maximum speed. Based on the first control signal, the second control signal, and the third control signal, the primary controller ensures that the vehicle will not exceed the maximum speed.

In some examples, the primary controller may generate and send one or more control signals based on a determination that the vehicle is operating in an autonomous mode of operation. In such examples, the primary controller may cause the vehicle to be controlled autonomously according to the identified constraint(s). In some examples, the primary controller may generate and send one or more control signals based on a determination that the corresponding constraint(s) are associated with a manual mode of operation (e.g., manually assisted or influenced mode of operation) and that the vehicle is operating in the manual mode of operation. In such examples, the primary controller may be configured to ignore constraint(s) associated with the autonomous mode of operation while the vehicle is being controlled in a manual mode. For example, the primary controller may identify a first constraint associated with an autonomous mode of operation (e.g., constraint associated with an autonomous controller) and a second constraint associated with a manual mode (e.g., maximum vehicle speed). Based on a determination that the vehicle is being operated in a manual mode of operation, the primary controller can withhold data associated with first constraint in vehicle control considerations (e.g., not generate and send control signals associated with the first constraint) and can generate and send control signals associated with the second constraint.

In various examples, the primary controller may be configured to receive a request, from an operator of the vehicle, such as via an interface, to override a constraint applied to the vehicle. For example, the primary controller can cause the vehicle to be constrained to a maximum speed. The primary controller can receive a request from the operator to override the maximum speed. In various examples, the primary controller can determine whether to enable the override based on one or more components associated with the constraint. In such examples, the primary controller can identify one or more components associated constraints that may be manually overridden, such as non-safety related component(s) and/or constraints. Based on a determination that the constraint may be overridden, the primary controller may cease control of the component (e.g., cease sending the control signal(s) to the component to limit an operation thereof). Based on a determination that the constraint is not configured to be overridden, the primary controller may continue sending control signal(s) to the component to limit the operation thereof. In some examples, the primary controller may cause an error notification (e.g., an indication of denial of the request to override the constraint) to be presented on a display of a computing device associated with the operator, such as to inform the operator of a denial of the request to override the constraint.

In various examples, the primary controller may determine to cease operation of the vehicle based on one or more faults associated with components of the vehicle (e.g., constraint includes a ceasing of operations, no-go, etc.). In such examples, the primary controller may send control signals to component(s) of the vehicle to cause the vehicle to navigate to a stopped location. The stopped location may include an identified location on a drivable surface of a road, such as that outside of a flow of traffic. For example, the stopped location may include a parking spot, a shoulder of a road, or the like.

In some examples, the primary controller may receive, after ceasing operations and from the stopped location, a request to enter a recovery mode of operation. The recovery mode of operation may include a mode of operation with limited parameters (e.g., limited speed, acceleration, turn radius, time, etc.). In at least one example, the recovery mode may enable continued operation of a faulted vehicle, such as to navigate the vehicle to a location in which it may be fixed or transported (e.g., onto a trailer, to a maintenance facility, etc.).

Based on a determination that the request to enter the recovery mode is valid, the primary controller may enable continued operation of the faulted vehicle according to the limited parameters of the recovery mode. In various examples, the primary controller may generate and send one or more control signals to cause the faulted vehicle to be operated within the limited parameters. In some examples, the control signals can include maximum operating limitations associated with the limited parameters. In such examples, the primary controller can ensure that the vehicle is operated within the limited parameters while operating in a manual mode. In some examples, the control signals include signals to control vehicle components within the limited parameters, such as in an autonomous mode of operation.

The techniques discussed herein may improve the functioning of a vehicle computing system in many ways. As described above, conventional systems can include two or more independent controllers configured to identify faults with associated components. Based on an identified fault by a single controller, the controller may cause the vehicle to cease operation. After determining to cease operations, the vehicle computing system may run diagnostic tests and send messages to a remote computing device, such as to provide information about the failure. These diagnostic tests and messages utilize computing resources and network bandwidth.

Unlike the conventional systems with independent controllers, the techniques described herein provide for centralized constraint detection and determination by the primary controller. At least because the constraint detection and determination is centralized, the resulting no-go determinations can be minimized, thereby decreasing the amount of processing power and network bandwidth utilized by the system, such as to run diagnostic tests and send failure messages to remote computing devices.

Additionally, the techniques described herein can improve the safe operation of an autonomous vehicle. For example, two different controllers may each identify a same or similar constraint to apply to vehicular operation, but with different values. The techniques described herein include a primary controller that is configured to identify a most conservative constraint to apply and generate control signals based on the most conservative constraint. That is, the primary controller can improve the safe operation of the vehicle by limiting vehicular operation based on a most conservative constraint.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques may be utilized in an aviation or nautical context, or in any system using planning techniques.

FIG. 1 is a block diagram illustrating example components of a system 100 configured to control vehicular operation based on component diagnostics, in accordance with examples of this disclosure. In various examples, the system 100 can include a portion of a vehicle computing system associated with a vehicle that is configured for autonomous, semi-autonomous, and/or manual operation. In at least one example, the system 100 can include components of the vehicle computing system that are configured to control an operation (or function) of the vehicle in one or more modes of operation (e.g., autonomous, semi-autonomous, manual, etc.).

In the illustrative example, the system 100 includes a first control unit 102 including a motion controller 104 and motion control components 106 (e.g., a first motion control component 106a, a second motion control component 106b, and an nth motion control component 106n, etc., collectively referred to as motion control components 106), and second control unit 108 including an autonomation (AI) controller 110 and AI control components 112 (e.g., a first AI control component 112a, a second AI control component 112b, and an mth AI control component 112m, etc., collectively referred to as AI control components 112). Though illustrated as including two control units (e.g., the first control unit 102 and the second control unit 108), this is not intended to be so limiting and the system 100 may include additional or alternative control units.

The motion controller 104 (e.g., primary controller) of the first control unit 102 includes a controller configured to control motion of the vehicle, such as an amount of torque to apply to a motor and/or brakes, steering commands, and the like. In at least one example, the motion controller 104 may be configured with safety related hardware and software, such as to ensure a safe operation of a vehicle. In various examples, the motion controller 104 receives motion control diagnostic data 114 from the motion control components 106. In various examples, respective motion control components 106 are configured to generate the motion control diagnostic data 114 based in part on data received from one or more sensors associated with the vehicle.

In some examples, the motion control diagnostic data 114 may include a state (e.g., active, inactive, faulted, etc.) of each motion control component 106a, 106b, and/or 106n. In some examples, the motion control diagnostic data 114 may include one or more faults associated with one or more of the motion control components 106. In at least one example, each fault of the one or more faults may be represented by a code (e.g., series of numbers, symbols, letters, etc.) that is provided to the motion controller 104. In such an example, based on the code and the source of the code (e.g., respective motion control component 106 from which it was received), the motion controller 104 may be configured to identify the fault. For example, the motion controller 104 may receive motion control diagnostic data 114 from a first motion control component 106a, the motion control diagnostic data 114 including a first fault code (e.g., 1234, etc.). Based on the first fault code and an identification of the first motion control component 106a as the source of the first fault code, the motion controller 104 may identify the fault.

In some examples, the motion controller 104 may determine that the identified fault may not be associated with vehicular operations. In such examples, the motion controller 104 may determine that no constraints (or limitations, restrictions, etc.) on vehicular operations (or functions) are associated with the identified fault. For example, an identified fault may be associated with a portion of a sensor data storage system. Based on a determination that the portion of the sensor data storage system is not associated with a constraint to vehicular operations, the motion controller 104 may determine to withhold fault data from vehicle control considerations (e.g., not apply a constraint to vehicular operations) based on the fault. That is, the motion controller 104 may determine to not control an operation or function of a component of the vehicle based on a determination to withhold the data. In various examples, the motion controller 104 may store data associated with the fault, such as in a local database of the vehicle computing system. In some examples, the motion controller 104 may send fault data 116 associated with the identified fault to one or more computing systems 118, such as to indicate that maintenance may be necessary. Though described as being configured to send fault data 116 associated with the motion control components 106, the motion controller 104 may additionally or alternatively be configured to provide fault data 116 associated with one or more AI control components 112, such as based on data received from the AI controller 110 or another controller. In various examples, the fault data 116 may include identified faults, associated components, determined constraints based on the faults, and/or other data associated with the fault and/or constraint.

In various examples, the motion controller 104 may determine that the identified fault is associated with a first constraint to vehicular operations. A constraint (e.g., the first constraint) may include a limitation or restriction on the operation or function of the vehicle. In some examples, the constraint may include a limitation or restriction on a parameter of operation of the vehicle (e.g., speed, acceleration, turn radius, power output, etc.)) As non-limiting examples, the constraint may include a limitation on speed (e.g., maximum speed), acceleration (e.g., maximum lateral and/or longitudinal acceleration), turn radius, a vehicle trajectory (e.g., right turn not authorized, etc.), a direction of travel (e.g., reverse travel disable, etc.), a drivetrain configuration of the vehicle (e.g.,), a mission of the vehicle (e.g., manual operation, autonomous operation, etc.), a power mode or voltage associated with an electric motor (e.g., standby mode, accessory power mode, high voltage power mode, etc.), a collision response system (e.g., battery connection disabled in response to collision, airbag unavailable), and/or any other limitations on the operation of the vehicle and/or systems associated therewith. In various examples, the motion controller 104 may be configured to determine the first constraint based on the identified fault associated with the motion control diagnostic data 114.

In various examples, the motion controller 104 may be configured to identify a second constraint associated with one or more components of the vehicle based on AI constraint data 120 provided by the AI controller 110. The AI controller 110 (e.g., secondary controller) includes a controller configured to monitor operations of AI control components 112 associated with autonomous operation of the vehicle. For example, a first AI control component 112a may include a planner component that is configured to determine a route for the vehicle to traverse through an environment, such as based on detected objects.

In various examples, the AI controller 110 may be configured to receive AI component diagnostic data 122 from the AI control components 112 and identify one or more constraints to apply to a component of the vehicle based on the AI component diagnostic data 122. The AI component diagnostic data 122 may include a state of an associated AI control component and/or a fault associated therewith, such as described above with regard to the motion control diagnostic data 114.

In various examples, respective AI control components 112 may generate the AI component diagnostic data 122 based in part on sensor data 124 received from one or more sensors 126 of the vehicle (e.g., first sensor 126a, second sensor 126b, xth sensor 126x, collectively referred to as sensors 126). The sensors 126 may include vision sensors (e.g., cameras, lidar, radar, etc.), inertial sensors (e.g., IMU, wheel encoder, etc.), location sensors (e.g., GPS, etc.), and the like. In at least one example, the sensors 126 may include a plurality of sensors configured to provide sensor data to the AI control components 112 to enable autonomous or semi-autonomous operation of the vehicle.

In various examples, the AI controller 110 may identify a constraint that is associated with the second control unit 108 (and not the first control unit 102) based on the AI component diagnostic data 122. That is, the AI controller 110 may determine that the constraint is associated with autonomous control of the vehicle (e.g., not overall control of the vehicle). In some examples, based on the identified constraint the AI controller 110 may generate and send an AI control signal 128 to one or more associated AI control components 112, such as to limit an operation of the associated component(s). In at least one example, any potential safety-related faults (e.g., probability that the fault could be related to safe operation of the vehicle is above a threshold probability) associated with the AI control components 112 are provided to the motion controller 104. That is, based on a determination that a fault associated with an AI control component 112 may be associated with a safety-related function of the vehicle, the AI controller 110 may provide data associated with the fault to the motion controller 104, such as in AI constraint data 120.

In some examples, the AI controller 110 may be configured to determine that the vehicle is being operated in a manual mode of operation (e.g., manually assisted or influenced mode of operation), and based on the operation in the manual mode, may withhold the AI control signal 128 from the associated component(s). In some examples, the AI controller 110 may determine that the vehicle is being operated in the manual mode, and may provide the AI control signal 128 to the associated component(s), based on a determination that a fault and/or constraint associated therewith is associated with the manual mode (e.g., should still be applied while the vehicle is being controlled at least in part by human input). In various examples, the manual mode of operation may include a mode of operation that includes human input to influence at least one control determination associated with vehicular operations. In some examples, the manual mode of operation may include an operator located physically in or on the vehicle, and/or proximate the vehicle (e.g., with a remote device configured for vehicular control) and configured to input one or more control signals to cause the vehicle to be controlled, at least in part, based on the control signal(s). In some examples, the manual mode of operation may include an operator located remote from the vehicle (e.g., teleoperator) and configured to provide control signal(s) to assist in controlling the vehicle. In such examples, the operator (e.g., teleoperator) may provide control signal(s) that are consumed in whole, or in part, by the AI controller 110. That is, the control signal(s) provided by the teleoperator may cause the AI controller 110 to generate one or more AI control signals 128 and/or AI constraint(s) signal(s) 120.

In some examples, the AI controller 110 may store the constraint and/or the fault associated with the component(s) in a datastore associated with the vehicle computing system. In some examples, the AI controller 110 may be configured to disable an autonomous mode of operation of the vehicle based at least in part on the constraint. That is, the AI controller 110 may provide an indication to the operator of the vehicle that the autonomous mode is not available. In some examples, the indication may be presented to the operator on a display associated with the vehicle. In some examples, the indication may be presented to the operator in response to receiving a request, from the operator, to engage the autonomous mode. In such examples, the indication may include an error notification, notifying the operator that autonomy is not available.

In some examples, the AI controller 110 may determine that another constraint (e.g., second constraint) identified based on the AI component diagnostic data 122 is associated with the operation of the vehicle. In some examples, a determination that the second constraint is associated with the operation of the vehicle can include a determination that the second constraint is associated with an overall operation of the vehicle (e.g., maximum speed, maximum acceleration, etc.). In some examples, a determination that the second constraint is associated with the operation of the vehicle can include a determination that the second constraint is associated with a mode of operation in which the vehicle is currently operating, such as a manual mode, an autonomous mode, a semi-autonomous mode, and/or the like.

Based on a determination that the second constraint is associated with the operation of the vehicle, the AI controller 110 sends the second constraint to the motion controller 104, such as in the AI constraint data 120. In various examples, the AI constraint data 120 may include aggregated constraints determined by the AI controller based on AI component diagnostic data 122. Additionally, the AI constraint data 120 may include diagnostic data associated with the second constraint. That is, the AI constraint data 120 may include fault data associated with an AI control component 112 that caused the AI controller 110 to identify the second constraint.

In various examples, the motion controller 104 may receive the AI constraint data 120 from the AI controller 110 and may be configured to validate the second constraint. In some examples, the motion controller 104 may evaluate the second constraint and associated diagnostic data to determine whether the second constraint is valid. Based on a determination of invalidity, the motion controller 104 may withhold data associated with the second constraint from vehicle control considerations. Based on a determination of validity, the motion controller 104 may include data associated with the second constraint in vehicle control considerations.

Additionally, in some examples, the motion controller 104 may be configured to receive a third constraint from the computing system(s) 118, such as in constraint input(s) 130. The computing system(s) 118 may include a computing system that is remote from the vehicle and/or is external to the first control unit 102 and/or the second control unit 108. For example, the computing system(s) 118 may include a computing system associated with a teleoperator configured to provide vehicle control inputs from a remote location. For another example, the computing system(s) 118 may include a computing system associated with an operator or passenger of the vehicle, such as one located in the vehicle and able to provide control inputs. In such an example, and as will be discussed in greater detail below with regard to FIGS. 4 and 5, the operator may input, via an interface, a constraint to apply to the operation of the vehicle, which is transmitted to the motion controller 104 as the constraint input(s) 130.

In various examples, the motion controller 104 may be configured to determine whether the first constraint (e.g., determined based on motion control diagnostic data 114), the second constraint (e.g., received from the AI controller 110), and/or the third constraint (e.g., received from the remote computing system(s)) are associated with a same or similar type of constraint (e.g., speed, acceleration, steering, voltage, etc.). In various examples, based on a determination that the first constraint, the second constraint and/or the third constraint are associated with different, independent, types of constraints, the motion controller 104 may determine to apply the different constraint(s) in vehicle control considerations.

In various examples, based on a determination that two or more of the constraints (e.g., the first constraint, the second constraint, the third constraint, etc.) are associated with a same or similar type of constraint, the motion controller 104 may compare values associated with the two or more constraints to determine a constraint to apply in vehicle control considerations. In various examples, the motion controller 104 may be configured to identify a most conservative constraint of the two or more constraints, and may apply the most conservative constraint in vehicle control considerations. For example, a first constraint may include a first speed as a maximum speed for vehicular operation and a second constraint may include a second speed as a maximum speed. The motion controller 104 may select the constraint associated with a slower speed between the first speed and the second speed, to apply in vehicle control considerations.

In some examples, the motion controller 104 may be configured to determine a probability of fault in a component associated with a fault. In such examples, the motion controller 104 may determine whether to consider an associated constraint in vehicle control considerations (e.g., component control determinations) based on the probability of fault. That is, the motion controller 104 may identify a probability that the component associated with a particular constraint is providing erroneous data. The probability of fault may be determined based on historical data associated with performance of the component, component statistics (e.g., provided by manufacturer), calibration data, time since a last calibration, reliability of sensor data processed by the component, and/or other factors that may influence a probability that a component may provide erroneous data. In some examples, based on a determination that the probability of fault is equal to or greater than a threshold probability, the motion controller 104 may withhold the associated constraint from vehicle control considerations, regardless of whether the associated constraint was a most conservative constraint between two or more same or similar constraints. In such examples, the motion controller 104 may determine to apply another (less conservative) constraint of a same or similar type, based on the high probability of fault associated with the more conservative constraint.

As mentioned above, the motion controller 104 may identify one or more constraints to apply to vehicle control considerations. Based on an identification of the constraint(s) to apply, the motion controller 104 may generate one or more control signals to cause associated component(s) to limit operation of the vehicle based on the constraint(s). In some examples, the motion controller 104 may generate motion control constraint signal(s) 132 to cause the motion control components 106 to control the vehicle according to the constraint(s). In such examples, motion controller 104 may cause the vehicle to be controlled, via the relevant motion control component(s) 106, based on the constraint(s).

Additionally or alternatively, the motion controller 104 may generate and send AI constraint signal(s) 134 to the AI controller 110. In various examples, the AI constraint signal(s) 134 may include one or more of the constraint(s) determined to be applied to vehicular operation. In some examples, the AI constraint signal(s) 134 may include the constraint(s) that are associated with the second control unit 108. In such examples, the AI constraint signal(s) 134 include constraints that are determined to be associated with autonomous control of the vehicle. In various examples, the AI controller 110 may process the constraint data provided in the AI constraint signal(s) 134 and may generate AI control signal(s) 128 to provide to relevant AI control components 112. In such examples, the motion controller 104 may cause the vehicle to be controlled, via the relevant AI control components 112, based on the constraint(s).

In various examples, one or more of the motion control constraint signal 132, the AI constraint signal(s) 134, and/or the AI control signal(s) 128 may include a same or substantially similar (e.g., within a threshold amount) value of a constraint to apply to the operation of the vehicle. For example, a constraint may include a limitation on a mission to not change lanes to the left, based in part a degraded sensor and/or unreliable sensor data associated with a left side of the vehicle. In such an example, the motion control constraint signal 132, the AI constraint signal(s) 134, and/or the AI control signal(s) 128 may include a same or similar limitation to not permit a lane change to the left.

In various examples, one or more of the motion control constraint signal 132, the AI constraint signal(s) 134, and/or the AI control signal(s) 128 may include different values associated with a constraint, such as to ensure that the constraint is not exceeded. For example, a constraint may include a maximum operating speed for the vehicle. The motion controller 104 may generate an AI constraint signal 134 to send to an AI controller to cause a planner component (e.g., first AI control component 112*a*) to set a first speed that is less than the maximum speed, a first motion control constraint signal 132 to send to a drive system (e.g., first motion control component 106*a*) to de-rate torque output based on a second speed that is less than the maximum speed, and a second motion control constraint signal 132 to send to a motor based on a third speed that is less than the maximum speed. Based on the AI constraint signal 134, the first motion control constraint signal 132, and the second motion control constraint signal 132, the motion controller 104 may ensure that the vehicle will not exceed the maximum speed associated with the constraint.

In various examples, the motion controller 104 may generate and send the AI constraint signal(s) 134 based on a determination that the vehicle is operating in an autonomous mode (e.g., fully autonomous, semi-autonomous, etc.). In such examples, the motion controller 104 may cause the vehicle to be controlled autonomously according to the identified constraint(s). In various examples, the motion controller 104 may determine to withhold one or more of the AI constraint signal(s) 134 based on a determination that the constraint is associated with the autonomous mode, but the vehicle is operating in a manual mode. In such examples, the motion controller 104 may determine that a constraint associated with the AI constraint signal(s) 134 is not relevant to the manual mode (e.g., not associated with the manual mode). Continuing the example from above regarding the mission limitation of changing lanes to the left, the motion controller 104 may determine that the constraint is not relevant to the manual mode of operation and may withhold an AI constraint signal 134 (from the AI controller) associated with the constraint.

Alternatively, the motion controller 104 may send the AI constraint signal(s) 134 including the constraint to the AI controller 110, with an indication that the constraint is not relevant to the manual mode of operation. In such examples, the AI controller 110 may store data associated with the AI constraint signal 134, such as to implement at a future time when autonomy is engaged. As discussed above, the AI controller 110 and/or the motion controller 104 may be configured to determine that, based on the constraint, an autonomous mode of operation is not available. In various examples, the AI controller 110 and/or the motion controller 104 may provide an indication that the autonomous mode is not available, such as via a display associated with the computing system(s) 118.

In various examples, the motion controller 104 may determine that the vehicle is operating in the manual mode and that a constraint is associated with the manual mode of operation. Based on a determination that the constraint is associated with the manual mode, the motion controller 104 may generate and send motion control constraint signal(s) 132 and/or AI constraint signal(s) 134 associated with the constraint. In response to receiving the motion control constraint signal(s) 132 and/or AI constraint signal(s) 134 the associated motion control component(s) 106 and/or AI control component(s) 112 may cause the vehicle to be controlled according to the constraint. In various examples, the motion controller 104 may receive a request, such as via the computing system(s) 118 to override the constraint applied. In various examples, the motion controller 104 may determine a constraint type associated with the constraint and may determine whether to enable the override based on the constraint type. As an illustrative, non-limiting example, the motion controller 104 may enable an override of a trajectory constraint associated, but may not enable an override of a maximum speed constraint.

In at least one example, a determination of whether to enable the override may be based on a determination of whether the constraint is safety related and/or is associated with a safety-related component. For example, a constraint may include a power mode constraint that limits a voltage associated with a motor. Based on a determination that the constraint is safety related (e.g., a safety-related constraint), such as to not overheat the motor, the motion controller 104 may determine to not enable the override and may continue to control an operation or function of associated components based on the constraint. Based on a determination that constraint is not safety related and/or that the override is enabled, the motion controller 104 may cease controlling the component(s) associated with the constraint, such as by withholding the motion control constraint signal(s) 132 and/or the AI constraint signal(s) 134, and/or including an instruction to not implement the constraint.

In various examples, the motion controller 104 may determine to cease operation of the vehicle operating in the environment, based on one or more identified constraints and/or component faults associated therewith. In such examples, the motion control constraint signal(s) 132 and/or the AI constraint signal(s) 134 may include an instruction to cause the vehicle cease operation. In at least one example in which the vehicle is operating in an autonomous mode, in response to receiving an AI constraint signal 134, the AI controller 110 can implement a stop (e.g., no-go) trajectory. The stop trajectory may include a trajectory from a current location of the vehicle to a stopped location. In some examples, the stop trajectory may include an emergency stop trajectory, such as to transition the vehicle to the stopped location rapidly. The stopped location may include an identified location on a drivable surface of a road, such as that outside a flow of traffic. As non-limiting examples, the stopped location may include a parking spot, a shoulder of a road, and/or the like. As such, the AI controller 110 may be configured to navigate the vehicle to a safe, stopped location. In various examples, the AI controller 110 may send one or more trajectory and/or control signals to the motion controller 104 and/or the motion control components 106 to cause the vehicle to be controlled according to the stop trajectory.

In some examples, the motion controller 104 may receive a request to enter a recovery mode of operation, such as from the computing system(s) 118. The recovery mode of operation may include one or more parameters of operation that are different from a normal mode of operation (e.g., limited speed, limited acceleration, limited time, etc.). The normal mode of operation, described above, may include a mode in which the vehicle is operated according to one or more constraint(s) identified by the motion controller 104. For example, based on a determination that no constraints are currently applied to the vehicle operation the normal mode of operation may include operation of the vehicle according to operational parameters (e.g., general limits on vehicular motion and/or behavior, such as allowed top speed, turn angle, etc.). For another example, based on a determination that a constraint associated with making lane changes or turns exists while operating autonomously, the normal mode of operation may include disabling control of the vehicle beyond the stopped location.

In various examples, the motion controller 104 may determine whether the request to enter the recovery mode is valid. In various examples, the motion controller 104 may determine that the request is valid based in part on a type of constraint that resulted in the vehicle ceasing operations (e.g., ceasing self-propelled movement). As non-limiting examples, the type of constraints may include speed constraints, acceleration constraints, turn radius constraints, vehicle trajectory constraints, direction of travel constraints, drivetrain constraints, a mission constraints, power constraints, a collision response system constraints, and/or the like. In at least one example, a collision response system constraint may include a passive collision response system. The passive collision response system may include limitation on an operation or function of a passive safety system associated with the collision response system. Non-limiting examples of passive safety systems include airbag systems, restraint systems, active bumper systems, battery disconnect systems, and/or the like.

In at least one example, the motion controller 104 may determine that the request is valid based on a determination that a constraint other than a power limitation (e.g., inhibited from maintaining high voltage) and a constraint that no missions are allowed (e.g., drive gear disabled). In at least one example, the motion controller 104 may determine that the request is valid based on a determination that the constraint is unrelated to the safe operation of the vehicle (e.g., not a safety-related constraint). As such, the motion controller 104 may determine that the vehicle may be safely operated, in a limited capacity, to a location for maintenance.

In some examples, the request may be received from an operator of the vehicle (e.g., operator in the vehicle, remote operator, etc.). In such examples, the request may be valid based on a determination that the operator submitted a first input to arm the recovery mode and a second input to activate the recovery mode within a threshold period of time (e.g., 1 second, 3 seconds, 5 seconds, etc.). That is, the request may be validated based on a determination that the first input to arm and the second input to activate the recovery mode are received within the threshold period of time of one another.

In some examples, the request may be automatically generated by a computing system(s) 118, such as based on receiving a message that the vehicle has been controlled to a stopped location according to a stop trajectory. In some examples, the motion controller 104 may be configured to generate and send the message to the computing system(s) 118. In various examples, the message may include data associated with the fault(s) and/or constraint(s) applied to the vehicle, such as those resulting in a determination to cease operation. In various examples, the computing system(s) 118 may be configured to determine that, based on the fault(s) and/or constraint(s), the vehicle may operate according to the recovery mode, such as to navigate to a maintenance facility for repair. The computing system(s) 118 may then send, to the motion controller 104, the request to enter the recovery mode.

In various examples, the motion controller 104 may be configured to verify a source of the request. In some examples, the request to enter the recovery mode may include a unique identification code associated with the computing system(s) 118. In such examples, the motion controller 104 can verify the source of the request prior to enabling the recovery mode, such as to prevent malicious actors from remotely controlling the vehicle.

Based on a determination that the request is invalid (e.g., source not verified, the first and second input not received within the threshold period of time, etc.), the motion controller 104 may maintain control of the vehicle in the normal mode. As such, the motion controller 104 may continue to disable control of the vehicle from the stopped location. Based on a determination that the request is valid (e.g., source verified, first input and second input received within the threshold period of time), the motion controller 104 may cause the vehicle to be controlled according to the parameters of the recovery mode (e.g., constraints on the operation of the vehicle, maximum operating limitations, etc.). In some examples, the motion controller 104 may generate motion control constraint signal(s) 132 and/or AI constraint signal(s) 134 to cause the vehicle to be controlled according to the parameters of the recovery mode.

In some examples, the motion controller 104 may enable manual operation of the vehicle in the recovery mode. In such examples, the motion controller 104 can apply the constraints based on the parameters of the recovery mode, such as to prevent an operator from exceeding the parameters of the recovery mode. In some examples, the motion controller 104 may be configured to cause the vehicle to be autonomously controlled according to the parameters of the recovery mode. In such an example, the motion controller 104 and/or the AI controller 110 may be configured to identify a location for vehicle recovery (e.g., maintenance location) and control the vehicle from the stopped location to the location for vehicle recovery according to the parameters of the recovery mode.

In various examples, the motion controller 104 may determine that a time associated with the recovery mode has expired. The time may include a maximum time period in which the vehicle may be operated in the recovery mode, either autonomously or manually. In various examples, based on a determination that a difference between a recovery mode initiation time and a current time is equal to or greater than the time associated with the recovery mode, the motion controller 104 may cause the vehicle to be controlled according to the normal mode, such as by causing the vehicle to be controlled to a second stopped location. In examples in which the vehicle is operating in a manual mode, the switch back to the normal mode may cause one or more components of the vehicle to cease operating, thereby causing the vehicle to be controlled to the second stopped location. In examples in which the vehicle is operating in an autonomous mode, the modification to the normal mode may cause the AI controller to determine a second stop trajectory to by which to control the vehicle to the second stopped location. In some examples, the switch back to the normal mode may occur at the second stopped location, such as after the vehicle has been controlled to the location for vehicle recovery. In such examples, the motion controller 104 may disable one or more components of the vehicle, such as to prevent continued operation thereof until receiving maintenance input and/or another valid request to re-enter the recovery mode.

In various examples, a first time associated with an autonomous operation in the recovery mode may be the same or different from a second time associated with a manual operation of the vehicle in the recovery mode. In some examples, the motion controller 104 may be configured to automatically exit the recovery mode upon arrival at the location for vehicle recovery, while operating in the autonomous mode. In such examples, the recovery mode in the autonomous mode of operation may not have an associated expiration time. In some examples, the motion controller 104 may exit the recovery mode based on a request received from the computing system(s) 118.

In at least one example, the request may be received from an operator. In such an example, the motion controller 104 may determine to switch back to the normal mode of operation in response to determining that the request to exit the recovery mode is valid. In some examples, the motion controller 104 may determine that the request to exit the recovery mode is valid based on a determination that a first input to deactivate the recovery mode (e.g., disarm the recovery mode, arm the normal mode) is received within a second threshold time period of a second input to activate the normal mode. The second threshold time period may be the same or different as the threshold time period associated with activating the recovery mode, as described above.

FIGS. 2-4 and 6-8 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 2:
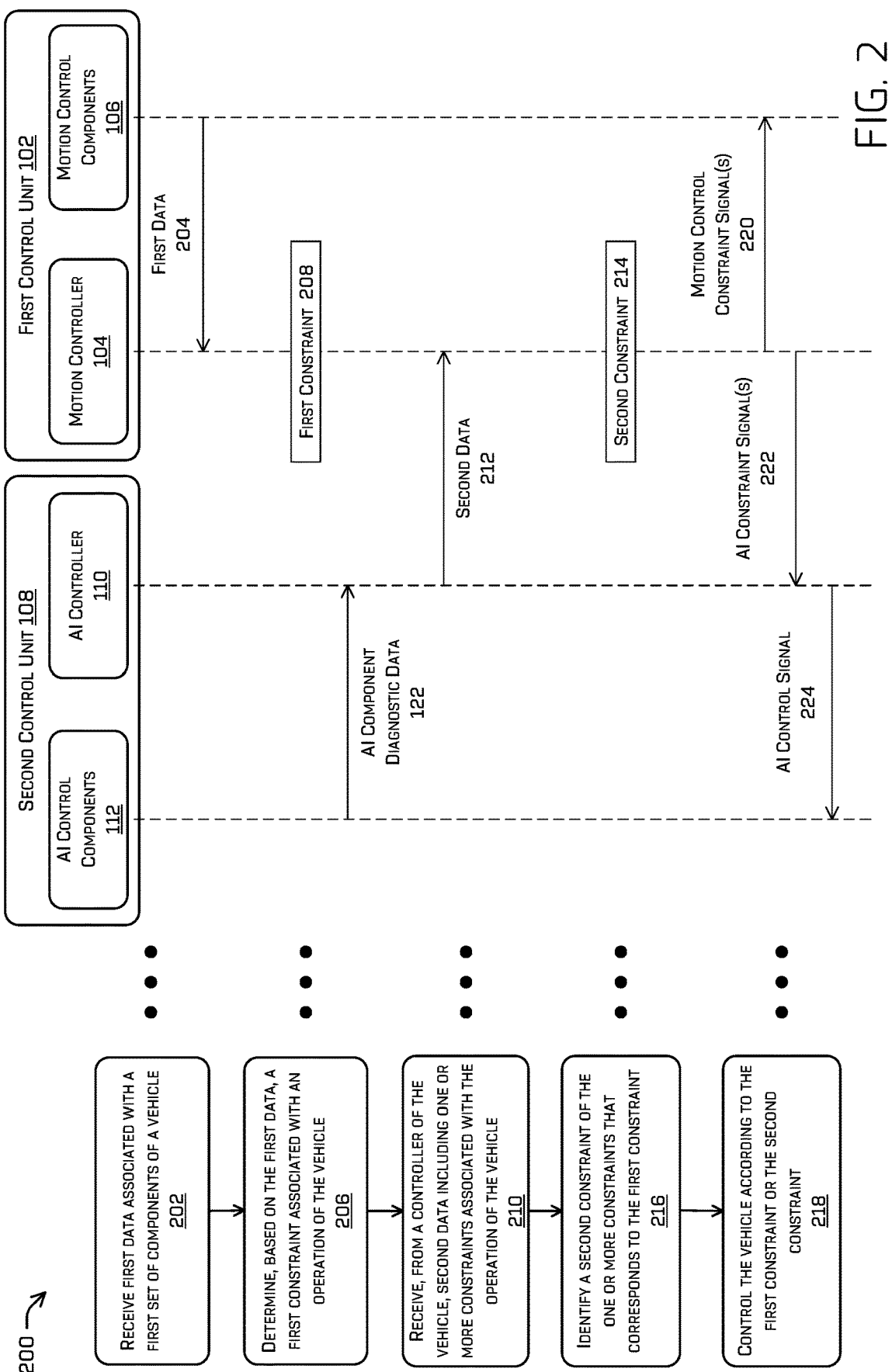
FIG. 2 depicts an example process for determining a constraint to apply based on inputs received from vehicle components, in accordance with examples of this disclosure.

FIG. 2 depicts an example process 200 for determining a constraint to apply based on inputs received from vehicle components, in accordance with examples of this disclosure. Some or all of the process 200 may be performed by one or more components of the system 100 and/or by the vehicle computing device(s) 904 of FIG. 9.

At operation 202, a motion controller 104 of a vehicle computing system receives first data 204 from one or more motion control components 106. As discussed above, the motion controller 104 and the motion control component(s) 106 may be associated with a first control unit 102 of the vehicle computing system. In at least one example, the first control unit 102 is associated with controlling movement of the vehicle, such as by causing torque to be applied to a motor and/or brakes, issuing steering commands, and the like. The motion controller 104 of the first control unit 102 generates control signals and sends the control signals to the motion control components 106 to control the movement of the vehicle. In at least one example, the motion controller 104 and/or the first control unit 102 may be configured with safety related hardware and software, such as to ensure a safe operation of a vehicle.

In various examples, the first data 204 may include diagnostic data (e.g., motion control diagnostic data 114) associated with a functioning of the motion control components. In various examples, the motion control components 106 may each generate diagnostic data based on a functioning of a respective motion control component 106. In some examples, the motion control components 106 may generate the diagnostic data based in part on sensor data received from one or more sensors associated with the motion control components 106. As non-limiting examples, the sensor(s) (e.g., sensor(s) 126) may include one or more wheel encoders (e.g., rotary encoders) to sense rotation of the wheels, inertial sensors (e.g., inertial measurement units, accelerometers, gyroscopes, magnetometers, etc.) to measure orientation and acceleration, cameras or other image sensors, ultrasonic sensors to acoustically detect objects in the surroundings of the vehicle, lidar sensors, radar sensors, etc.

The sensor(s) may include sensors that are associated with particular motion control components 106 and/or are associated with one or more other components of the vehicle. That is, the sensor(s) may provide sensor data to individual motion control components 106 and/or other components of the vehicle, such as AI control components 112. For example, a motion control component 106 may include a drive system that includes a wheel encoder that corresponds to a particular wheel of the vehicle. The wheel encoder may provide sensor data to the drive system based on wheel movement. In some examples, the motion control component 106 processes sensor data from the sensor(s) and/or data associated with a performance (or function) of the motion control component 106. In some examples, the motion control component 106 may provide performance data to the motion controller 104 as the first data 204.

In various examples, a motion control component 106 may identify one or more faults associated with the component and/or a related sensor. In some examples, the motion control component 106 may provide fault data associated with the one or more faults to the motion controller as the first data 204. At operation 206, the motion controller 104 determines, based on the first data 204, a first constraint 208 associated with an operation (or function) of the vehicle. Though illustrated in FIG. 2 as a single "first" constraint 208, it is understood that the motion controller 104 may be configured to identify two or more constraints to apply to vehicular operation based on the first data 204.

At operation 210, the motion controller 104 receives, from a controller of the vehicle (e.g., AI controller 110), second data 212 including one or more constraints associated with the operation of the vehicle. In at least one example, the second data 212 may include aggregated constraints to apply to vehicular operation, as determined by the AI controller 110 based on AI component diagnostic data 122 received from the AI control components 112. In various examples, and as described above, the AI controller 110 may be configured to receive the AI component diagnostic data 122 and determine a set of constraints to apply to one or more vehicle components. The AI controller 110 may determine that the one or more constraints (e.g., a second constraint 214) of the set of constraints apply to overall vehicular operation (e.g., constraints to apply to additional components other than AI control components 112). Based on a determination that the one or more constraints apply to overall vehicular operation, the AI controller 110 sends the one or more constraints to the motion controller 104 as the second data 212.

At operation 216, the motion controller 104 identifies the second constraint 214 of the one or more constraints that corresponds to the first constraint 208. In various examples, the motion controller may compare the second constraint 214 to the first constraint 208, such as to determine whether they are corresponding constraints, based on a determination of validity of the second constraint 214. In such examples, the motion controller 104 may determine the validity of the second constraint 214 based on diagnostic data associated with the AI control components from which the second constraint 214 was determined, the diagnostic data being included in the second data 212.

In various examples, the motion controller may determine that the second constraint 214 corresponds to the first constraint 208 based on a determination that the first constraint 208 and the second constraint 214 are associated with a same or similar type of constraint (e.g., constraint on speed, acceleration, turn radius, trajectory, direction of travel, drivetrain configuration, mission, power mode, collision response system, etc.). That is, the motion controller 104 may determine that the second constraint 214 corresponds to the first constraint 208 based on a determination that they include same values, substantially similar values (e.g., within a threshold value), or different values of a same or similar type of constraint.

At operation 218, the motion controller 104 controls the vehicle according to the first constraint 208 or the second constraint 214. In various examples, the motion controller 104 may identify a most conservative constraint between the first constraint 208 and the second constraint 214. The most conservative constraint may include a constraint with a value that is less than a value of the other constraint, or vice versa. For example, the first constraint 208 may include a first speed as a maximum speed for vehicular operation and the second constraint 214 may include a second speed as a maximum speed. The motion controller 104 may control the vehicle according to the slower speed between the first speed and the second speed.

Alternatively, the motion controller 104 may identify a constraint to apply between the first constraint 208 and the second constraint 214 based on probabilities of fault associated with each constraint. That is, the motion controller 104 may be configured to determine a probability that a component associated with the constraint is providing erroneous (e.g., inaccurate, faulty, etc.) information. The probability of fault may be determined based on historical data associated with performance of the component, component statistics (e.g., provided by manufacturer), calibration data, time since a last calibration, reliability of sensor data processed by the component, and/or other factors that may influence a probability that a component may provide erroneous data. In some examples, based on a determination that the probability of fault is equal to or greater than a threshold probability, the motion controller 104 may withhold the associated constraint from vehicle control considerations, regardless of whether the associated constraint was a most conservative constraint between the first constraint 208 and the second constraint 214. In such examples, the motion controller 104 may determine to apply another (less conservative) constraint of a same or similar type, based on the high probability of fault associated with the more conservative constraint.

In various examples, the motion controller 104 may control the vehicle by sending, to the motion control components 106, one or more motion control constraint signals 220, such as motion control constraint signal(s) 132. In various examples, the motion controller 104 may identify one or more motion control components 106 that are associated with the selected constraint (e.g., the first constraint 208 or the second constraint 214), and may send the motion control constraint signal(s) 220 to the identified motion control component(s) 106. The motion control constraint signal(s) 220 may include constraint data, including limitations to be applied to the vehicle and/or the respective motion control component 106.

In at least one example, a first motion control constraint signal 220 provided to a first motion control component 106 may include a first instruction to not exceed a first value associated with the constraint and a second motion control constraint signal 220 provided to a second motion control component 106 may include a second instruction to not exceed a second value associated with the constraint, at least one of the first value or the second value being less than the selected constraint. In such an example, the motion controller 104 ensures that the vehicle will not exceed the selected constraint. For example, the selected constraint may include a maximum operating speed for the vehicle. The motion controller 104 may provide a first motion control constraint signal 220 to a first motion control component 106 with a first instruction to not exceed a first speed that is less than the maximum operating speed for the vehicle. The motion controller may also provide a second motion control constraint signal 220 to a second motion control component 106 with a second instruction to not exceed a second speed that is also less than the maximum operating speed for the vehicle, but is different from the first speed. Based on the first instruction and the second instruction, the motion controller 104 may ensure that the vehicle will not exceed the maximum operating speed of the vehicle.

In various examples, the motion controller 104 may control the vehicle by sending, to the AI controller 110, one or more AI constraint signals 222, such as AI constraint signal(s) 134. The AI constraint signal(s) 222 may include an instruction to cause one or more AI control components 112 to maintain operation of the vehicle within the selected constraint. That is, the AI constraint signal(s) 222 may cause the AI controller 110 to control the AI control components 112, such as via AI control signals 224 (e.g., AI control signals 128) to operate within the limitations of the selected constraint. As discussed above, the one or more AI constraint signals 222 and the one or more motion control constraint signals 220 may include the same or different value associated with the selected constraint, such as to ensure that the selected constraint is not exceeded. As such, the motion controller 104 provides constraint signals associated with various components of the vehicle (e.g., motion control components 106, AI control components 112, etc.), to control the vehicle according to the limitations of the selected constraint.

Figure 3:
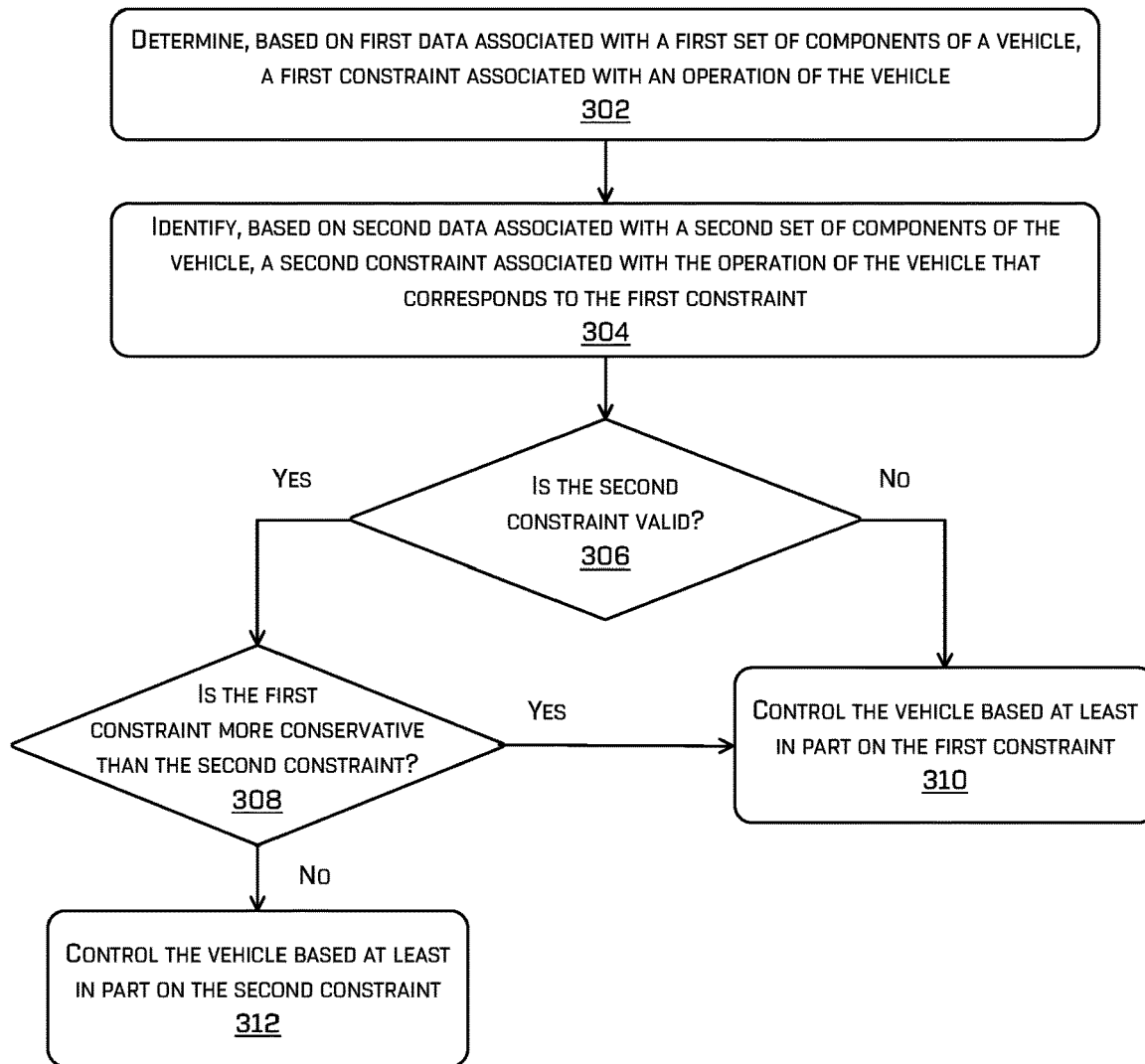
FIG. 3 depicts another example process for determining a constraint to apply based on inputs received from vehicle components, in accordance with examples of this disclosure.

FIG. 3 depicts another example process 300 for determining a constraint to apply based on inputs received from vehicle components, in accordance with examples of this disclosure.

At operation 302, a vehicle computing system (e.g., motion controller 104) determines, based on first data associated with a first set of components of a vehicle, a first constraint associated with an operation (or function) of the vehicle. In at least one example, the first set of components may include motion control components, such as motion control components 106. In other examples, the first set of components may include additional or alternative components of the vehicle.

In various examples, the first data may include diagnostic data associated with the first set of components. The diagnostic data may include one or more faults associated with the first set of components. In at least one example, the vehicle computing system may be configured to identify the first constraint based on one or more faults associated with the first set of components that are included in the first data.

At operation 304, the vehicle computing system identifies, based on second data associated with a second set of components of the vehicle, a second constraint associated with the operation of the vehicle that corresponds to the first constraint. The second set of components may include AI control components, such as AI control components 112, and/or other components of the vehicle that are different from the first set of components.

In at least one example, the vehicle computing system receives the second data from a controller of the vehicle (e.g., AI controller). In some examples, the second data may include the second constraint and/or associated diagnostic data. That is, the second data may include data associated with a constraint that is determined by the controller, such as based on diagnostic data associated with the second set of components. In various examples, the controller may provide the second constraint and associated diagnostic data (e.g., diagnostics associated with one or more faulted components corresponding to the constraint(s)) to the vehicle computing system for processing.

In various examples, the vehicle computing system may determine that the second constraint corresponds to the first constraint based on a determination that the first constraint and the second constraint are associated with a same or similar type of constraint (e.g., constraint on speed, acceleration, turn radius, trajectory, direction of travel, drivetrain configuration, mission, power mode, collision response system, etc.). That is, the vehicle computing system may determine that the second constraint corresponds to the first constraint based on a determination that they include the same values, substantially similar values (e.g., within a threshold value), or different values of a same or similar type of constraint.

At operation 306, the vehicle computing system determines whether the second constraint is a valid constraint. In various examples, the vehicle computing system evaluates the second constraint based on the associated diagnostic data associated with the faulted components. In such examples, the vehicle computing system may be configured to validate the second constraint based on the evaluation.

In various examples, the vehicle computing system may be additionally be configured to determine whether the second constraint is valid based on a current mode of operation of the vehicle. That is, the vehicle computing system may validate the second constraint based on a determination of whether the vehicle is operating in a manual mode, an autonomous mode, or a semi-autonomous mode. In some examples, based on a determination that the second constraint is not associated with the current mode of operation, the vehicle computing system may determine that the second constraint is invalid. For example, the vehicle may be currently operating in a manual mode and the second constraint may include a constraint on vehicular operation based on a component associated with autonomous operation. Based on a determination that the second constraint is associated with autonomous operation (and not manual operation), the vehicle computing system may determine that the second constraint is invalid (for current operations).

Additionally or alternatively, the vehicle computing system may determine whether the second constraint is valid based on an operational parameter. The operational parameter may include a pre-determined limitation on vehicular operation that is associated with a current operation of the vehicle. That is the operational parameter may include a non-fault based constraint on vehicular operation. For example, the operational parameter may include a maximum speed associated with the vehicle performing a particular mission. The maximum speed may be input based on the mission and may be unrelated to any detected faults or constraints determined on the detected faults. In various examples, the vehicle computing system may determine the operational parameter based on operator input and/or a pre-determined setting associated with an environment in which the vehicle operates. For example, an operational parameter may include a maximum speed limitation while operating in a pre-defined area. Based on a determination that the vehicle is operating in the area, the vehicle computing system may control the vehicle according to the operational parameter.

In various examples, the vehicle computing system determines whether the second constraint is valid based on a determination of whether the second constraint is more or less conservative than the operational parameter. Based on a determination that the second constraint is less conservative than the operational parameter, the vehicle computing system may determine that the second constraint is invalid. Based on a determination that the second constraint is more conservative than the operational parameter, the vehicle computing system may determine that the second constraint is valid. Continuing the example from above with the operational parameter including a maximum speed, the vehicle computing system determines that the second constraint includes a second maximum speed. In some examples, based on a determination that the second maximum speed is equal to or less than the operational parameter maximum speed, the vehicle computing system determines that the second constraint is valid. In some examples, based on a determination that the second maximum speed meets or exceeds the operational parameter maximum speed, the vehicle computing system determines that the second constraint is invalid.

Based on a determination that the second constraint is valid ("Yes" at operation 306), the vehicle computing system, at operation 308, determines whether the first constraint is more conservative that the second constraint. In various examples, a more conservative constraint may include a constraint that is slower, less aggressive, and/or more limiting than the other constraint(s). Based on a determination that the first constraint is more conservative than the second constraint ("Yes" at operation 308) and/or based on a determination that the second constraint is invalid ("No" at operation 306), the vehicle computing system, at operation 310, controls the vehicle based at least in part on the first constraint. As discussed above, the vehicle computing system generates and sends one or more constraint control signals, such as to control operation of the first set of components and/or the second set of components to cause the vehicle to be controlled according to the first (selected) constraint.

Based on a determination that the first constraint is less conservative than the second constraint ("No" at operation 308), the vehicle computing system, at operation 312, controls the vehicle based at least in part on the second constraint. In various examples, the vehicle computing system generates and sends one or more constraint control signals, such as to control operation of the first set of components and/or the second set of components to cause the vehicle to be controlled according to the second (selected) constraint.

Figure 4:
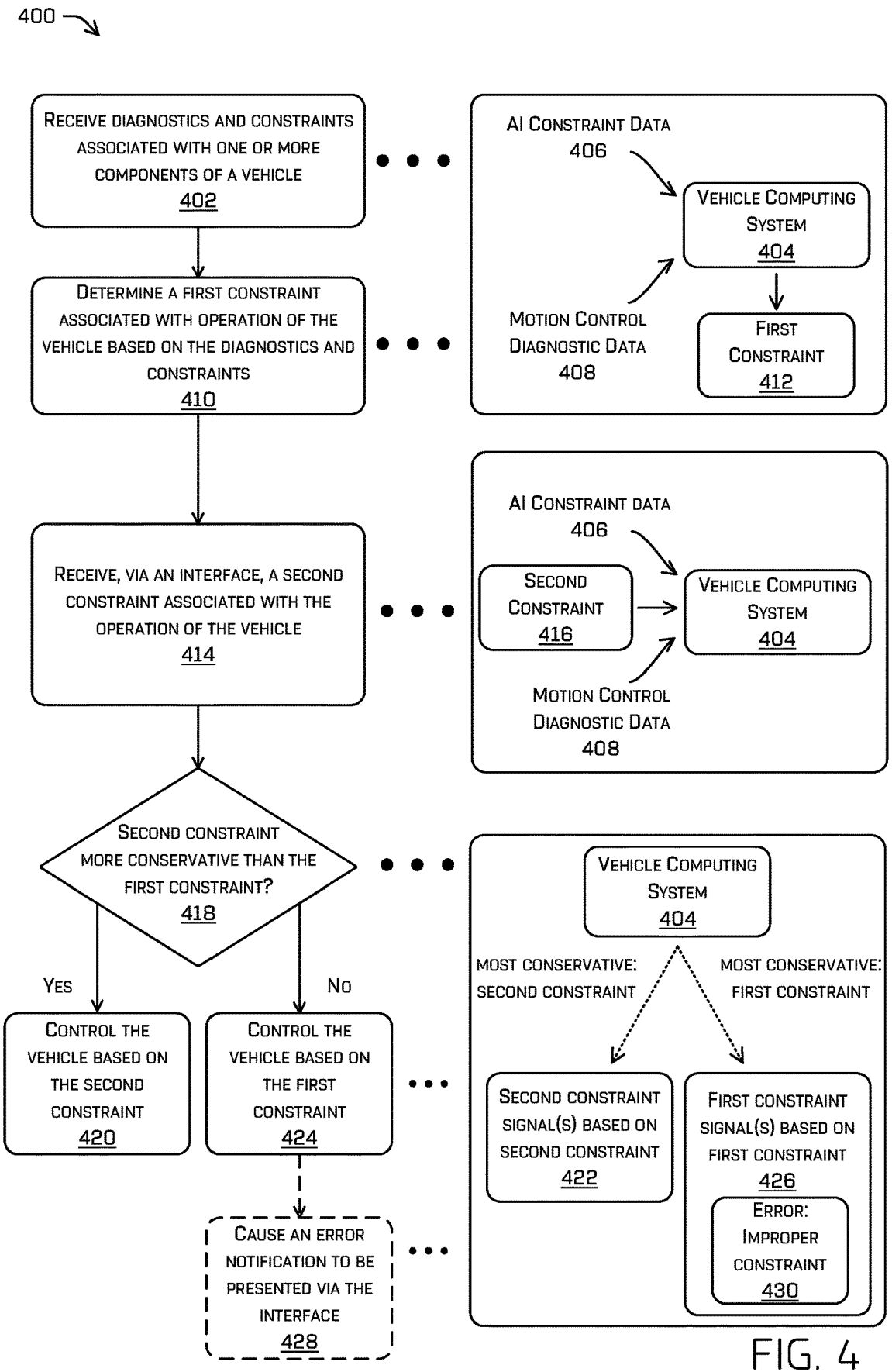
FIG. 4 depicts an example process for determining whether to apply a constraint received from an operator or remote computing device in vehicle control considerations, in accordance with examples of this disclosure.

FIG. 4 depicts an example process 400 for determining whether to apply a constraint received from an operator or remote computing device in vehicle control considerations, in accordance with examples of this disclosure.

At operation 402, a vehicle computing system 404 (e.g., motion controller 104) receives diagnostics and constraints associated with one or more components of a vehicle. In various examples, the diagnostics and constraints may be provided to the vehicle computing system as first data, such as first data 204, second data, such as second data 212, and/or the like. In various examples, the diagnostics may include one or more faults associated with the component(s) of the vehicle. In at least one example, a fault of the one or more fault(s) may be represented by a code (e.g., letters, numbers, signals, etc.). In such an example, the vehicle computing system may be configured to identify the fault based on the code and/or the source of the fault (e.g., component associated with the fault.

In at least one example, the diagnostics and constraints may include AI constraint data 406, such as AI constraint data 120, and motion control diagnostic data 408, such as motion control diagnostic data 114. In various examples, the AI constraint data 406 may include an aggregation of one or more constraints associated with a control unit configured to provide autonomous capabilities to the vehicle (e.g., second control unit 108). The AI constraint data 406 may include diagnostics associated with one or more components corresponding to the constraint(s) associated with the control unit. The motion control diagnostic data 408 may include diagnostic data associated with one or more motion control components, such as motion control components 106. In various examples, the vehicle computing system 404 may be configured to identify one or more constraints associated with the motion control diagnostic data 408.

At operation 410, the vehicle computing system 404 determines a first constraint 412 associated with operation of the vehicle based on the diagnostics and constraints. In some examples, the first constraint 412 may include a single constraint identified by the vehicle computing system 404 to be applied to vehicular operation (e.g., a single validated constraint). In some examples, the first constraint 412 may include a constraint that is selected, from two or more same or similar constraints, for application to vehicular operation. In some examples, the first constraint 412 may be identified (e.g., selected) based on a validation or invalidation of one or more constraints. In some examples, the first constraint 412 may be identified based on a determination that the first constraint 412 is a most conservative constraint of the two or more constraints. In some examples, the first constraint 412 may be identified based on a determination that another constraint is associated with a probability of fault that meets or exceeds a threshold probability of fault (e.g., and the other constraint is withheld from vehicle control considerations).

At operation 414, the vehicle computing system 404 receives, via an interface, a second constraint 416 associated with the operation of the vehicle. In various examples, the interface may be associated with an operator of the vehicle. In such an example, the second constraint may include a manually input constraint on the operation of the vehicle. The operator of the vehicle may include an operator located in or on the vehicle and/or at a remote location (e.g., teleoperator). In some examples, the interface may additionally or alternatively be associated with a remote computing system that is configured to monitor operations of the vehicle and provide the second constraint 416 to limit operation of the vehicle. In such examples, the interface may be associated with a remote computing system, and not necessarily an operator or human providing the input associated with the second constraint 416. For example, the remote computing system may be configured to identify that a threshold number (or density) of pedestrians are located proximate the vehicle. The remote computing system may thus send an instruction (e.g., control signal) to the vehicle computing system 404 with a second constraint 416, constraining vehicular operation to a threshold speed.

At operation 418, the vehicle computing system 404 determines whether the second constraint is more conservative than the first constraint. In various examples, a more conservative constraint may include a constraint that is slower, less aggressive, and/or more limiting than the other constraint(s). For example, a constraint may include a maximum operating speed for the vehicle. A more conservative constraint may include a constraint with a slower maximum operating speed than other constraint(s).

Based on a determination that the second constraint is more conservative than the first constraint ("Yes" at operation 418), the vehicle computing system 404, at operation 420, controls the vehicle based on the second constraint. In various examples, the vehicle computing system 404 controls the vehicle by generating and sending, to one or more vehicle components (e.g., AI controller 110, motion control components 106, etc.), one or more first constraint signals 422 (e.g., motion control constraint signal(s) 132, AI constraint signal(s) 134, etc.) based on the second constraint 416, such as to cause the vehicle to be controlled according to the second constraint 416.

Based on a determination that the second constraint is less conservative than the first constraint ("No" at operation 418), the vehicle computing system 404, at operation 424, controls the vehicle based on the first constraint 412. In various examples, the vehicle computing system 404 controls the vehicle by generating and sending, to the one or more vehicle components, one or more second constraint signals 426 (e.g., motion control constraint signal(s) 132, AI constraint signal(s) 134, etc.) based on the first constraint 412, such as to cause the vehicle to be controlled according to the first constraint 412.

At operation 428, the vehicle computing system may optionally (illustrated by the dashed line between operation 424 and operation 428) cause an error notification 430 to be presented via the interface. The error notification 430 may include an indication of denial of a request to implement the second constraint 416. In various examples, the error notification 430 may provide an indication to the operator that the second constraint 416 input by the operator was invalid or improper for current vehicular operation. In the illustrative example, the error notification includes "ERROR: IMPROPER CONSTRAINT," however, this is merely for illustrative purposes and is not intended to be so limiting.

In various examples, the error notification 430 may include additional or alternative information about the invalid second constraint 416, such as an indication that the vehicle is currently being constrained according to the first constraint 412, which is more conservative, an indication that the second constraint 416 is invalid for a current operational parameter (e.g., limitation or constraint on vehicular movement based on the operational parameter is more conservative than the second constraint 416, etc.), and/or other information about why the second constraint 416 was not applied to vehicular operations.

In various examples, the vehicle computing system 404 may send the error notification 430 to a computing device associated with the operator (e.g., computing system(s) 118), such as via a push notification or the like. In various examples, vehicle computing system 404 may cause the error notification 430 to be presented on a display of the computing device associated with the operator.

Figure 5:
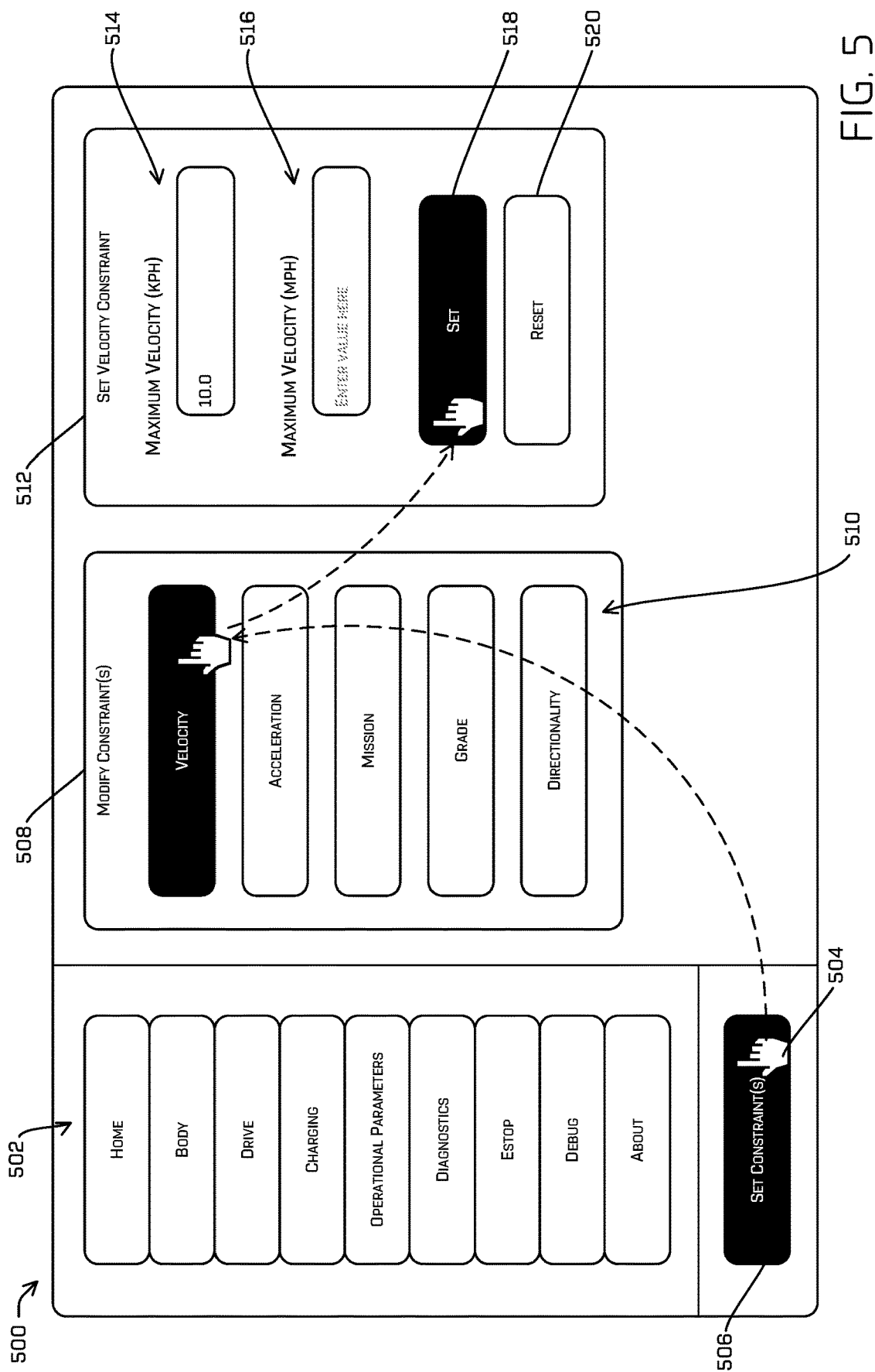
FIG. 5 illustrates an example user interface for manually inputting a constraint associated with vehicular operation, in accordance with examples of this disclosure.

FIG. 5 illustrates an example user interface 500 for manually inputting a constraint associated with vehicular operation, in accordance with examples of this disclosure. In various examples, the user interface 500 may be associated with a computing device associated with an operator of a vehicle (e.g., operator computing device), such as computing system(s) 118. As discussed above, the operator of the vehicle may be physically located in or on the vehicle and/or remote from the vehicle. For example, the operator may be a driver of the vehicle and/or may be situated in a driving position associated with the vehicle (e.g., driver's seat, proximate one or more manual controls, etc.). For another example, the operator may be a teleoperator located remotely from the vehicle and configured to provide operational guidance to the vehicle.

In various examples, the user interface 500 may be associated with a vehicle operation application. The application may include a web-based application and/or a native application associated with the operator computing device. In various examples, the vehicle operation application may be managed by a server computing device. In such examples, the server computing device may be configured to send instructions to the operator computing device to cause a presentation of one or more features of the user interface. In some examples, the server computing device may receive input via the user interface 500 (e.g., user input) and may be configured to transmit the input to the vehicle (e.g., to a vehicle computing system). In some examples, the operator computing device and/or the vehicle operation application may be directly connected to the vehicle computing system, such as via a wired and/or wireless connection. In such examples, the input received via the user interface 500 may be directly transmitted to the vehicle computing system.

In the illustrative example, the user interface 500 includes a configuration menu 502. The configuration menu 502 may enable a user 504 (illustrated as a cursor) to view one or more configurations associated with the vehicle. In the illustrative example, the configurations include a vehicle body, drive, charging, operational parameters, diagnostics, emergency stop, de-bug, and additional information about the vehicle. Additional and alternative configurations are contemplated herein, such as tests, experiments, component versions, a signal viewer, and/or the like. In various examples, the configuration menu 502 may additionally include a "HOME" option to enable the user 504 to navigate to a home screen associated with the user interface 500 and/or the vehicle operation application.

In various examples, the user interface 500 may include a set constraint selectable control 506. In various examples, the set constraint selectable control may enable the user 504 to input one or more constraints on the operation of the vehicle, such as the second constraint 416 described with respect to FIG. 4. In various examples, in response to receiving an indication of selection of the set constraint selectable control 506, the operator computing device and/or vehicle control application may cause a constraint modification menu 508 to be presented on the user interface 500.

In various examples, the constraint modification menu 508 may include one or more constraints on vehicular operation that may be modified by the user 504. That is, the constraint modification menu 508 may include one or more selectable controls 510 that, when selected by the user 504, enable the user 504 to modify a respective constraint. In the illustrative example, the constraint modification menu 508 includes a selectable control(s) associated with a velocity constraint, an acceleration constraint, a mission constraint, a grade constraint, and a directionality constraint. In other examples, the constraint modification menu 508 may include additional or alternative constraints that may be modified by the user 504.

In various examples, in response to receiving an indication of selection of a selectable control 510, the operator computing device and/or vehicle control application may cause a set constraint window 512 to be presented via the user interface 500. For example, the user 504 may select a selectable control 510 associated with a velocity constraint, and in response, the operator computing device and/or vehicle control application causes the set (velocity) constraint window 512 to be presented via the user interface 500. For illustrative purposes, the set constraint window 512 is described herein with respect to setting a velocity constraint. However, this is not intended to be so limiting and additional or alternative constraints may similarly be applied via an alternative selection of a different selectable control 510 and additional input via a different set constraint window 512.

In the illustrative example, the set (velocity) constraint window 512 includes a first velocity input section 514 associated with a first unit of measurement (e.g., kilometers per hour, illustrated as KPH) and a second velocity input section 516 associated with a second unit of measurement (e.g., miles per hour, illustrated as MPH). In various examples, the user 504 may input a speed into one of the first velocity input section 514 or the second velocity input section 516, but not both. In some examples, the operator computing device and/or the vehicle control application may receive input via one of the first velocity input section 514 or the second velocity input section 516, and may automatically fill in the other section with an appropriate value according to the unit of measurement. For example, the user 504 inputs a maximum velocity of 10.0 kph into the first velocity input section 514 and, based on the input, the operator computing device and/or the vehicle control application may input 6.21 mph into the second velocity input section 516. In some examples, the set (velocity) constraint window 512 may include one or the other (but not both) of the first velocity input section 514 or the second velocity input section 516. In such examples, the user may be limited to inputting a velocity associated with a single unit of measurement.

In various examples, the set (velocity) constraint window 512 may include a set constraint control 518. In response to receiving an indication of selection of the set constraint control 518, the operator computing device and/or the vehicle control application may send a user defined constraint (e.g., based on the user input into the first velocity input section 514 or the second velocity input section 516) to the vehicle computing system (e.g., motion controller 104) to limit vehicular operation.

In various examples, the set (velocity) constraint window 512 may additionally include a reset control 520. The reset control 520 may cause the operator computing device and/or vehicle control application to remove previously input user defined constraints associated with the constraint (e.g., velocity). That is, in response to receiving an indication of selection of the reset control 520, the operator computing device and/or vehicle control application may send an instruction to the vehicle computing system to remove the previously input velocity constraint. In various examples, in response to receiving the instruction, the vehicle computing system may remove the previously input velocity constraint from vehicle control considerations. In such examples, the vehicle computing system may control the vehicle according to operational parameters and/or other constraints (e.g., user defined constraints of a different type, constraints determined based on faults, etc.).

Figure 6:
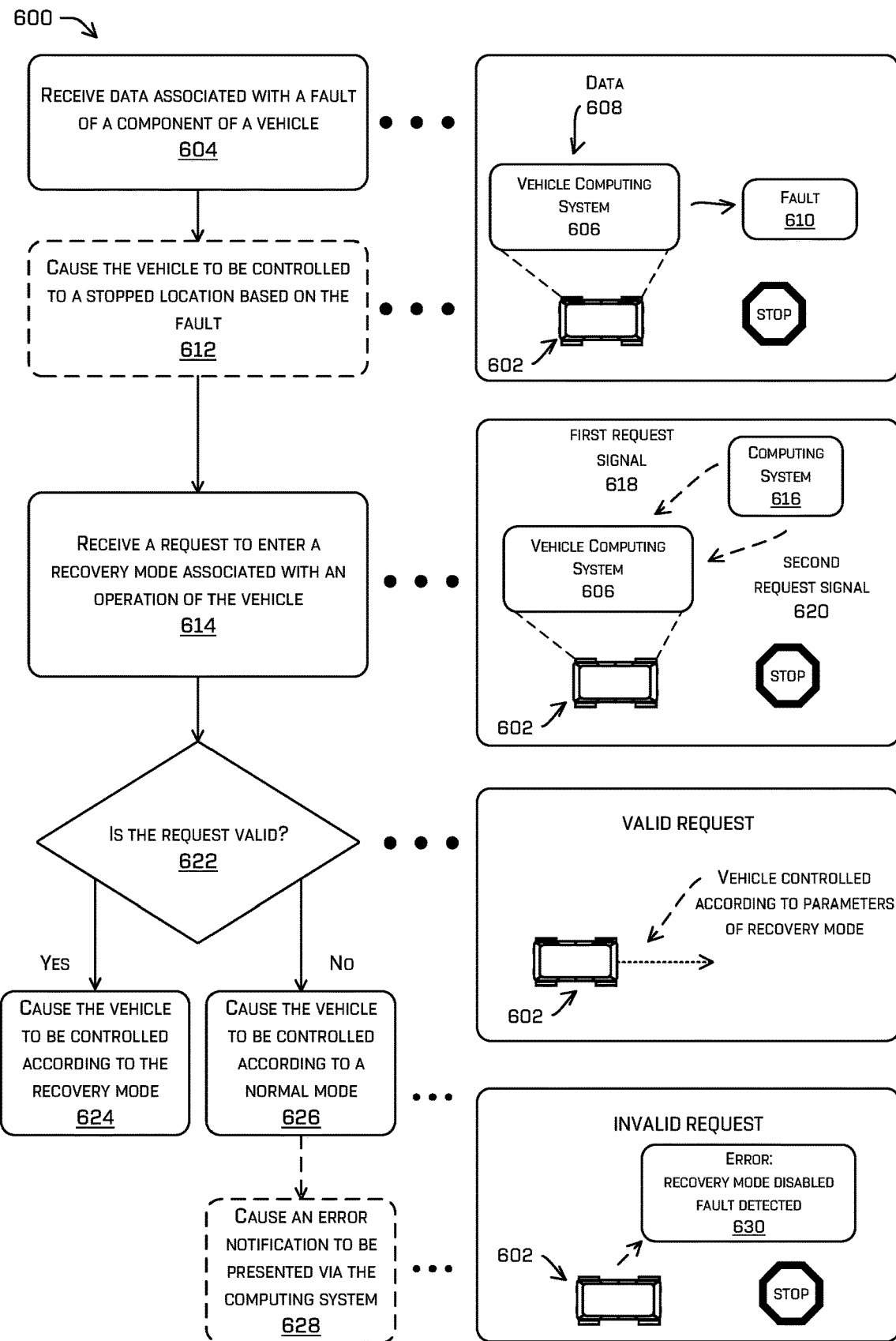
FIG. 6 depicts an example process for enabling operation of a vehicle in a recovery mode, in accordance with examples of this disclosure.

FIG. 6 depicts an example process 600 for enabling operation of a vehicle 602 in a recovery mode (of operation), in accordance with examples of this disclosure. As discussed above, the recovery mode may include a mode of operation with limited parameters (e.g., limited speed, acceleration, turn radius, time, etc.). In at least one example, the recovery mode may enable continued operation of a faulted vehicle, such as to navigate the vehicle to a location in which it may be fixed or transported (e.g., onto a trailer, to a maintenance facility, etc.). That is, the vehicle computing system may be configured to ignore select faults that are reported by components of the vehicle and/or constraints associated therewith. In some examples, the vehicle computing system may be configured to apply other constraints while controlling the vehicle according to the recovery mode. In at least one example, the vehicle computing system may be configured to ignore faults associated with vehicle trajectory limitations and/or limitations on missions of the vehicle.

At operation 604, a vehicle computing system 606 (e.g., motion controller 104) receives data 608 associated with a fault 610 of a component of the vehicle 602. The data may include constraint data and/or diagnostic data (e.g., first data, second data, etc.) as described above. In various examples, the vehicle computing system 606 may be configured to receive the data 608 and identify the fault 610 and/or the associated component, based on the data 608, and may identify a constraint to apply to the vehicle 602. In at least one example, the constraint may include a constraint on continued operations. That is, the vehicle computing system 606 may determine to cause the vehicle 602 to navigate to a stopped location, according to a stopped (e.g., no-go) trajectory, based on the fault 610. Though described herein as a single fault 610, this is not intended to be so limiting, and the vehicle computing system 606 may identify a combination of two or more faults that result in ceasing operation of the vehicle 602.

At operation 612, the vehicle computing system 606 may optionally cause the vehicle 602 to be controlled to a stopped location based on the fault. The stopped location may include an identified location on a drivable surface of a road, such as that outside a flow of traffic. As non-limiting examples, the stopped location may include a parking spot, a shoulder of a road, and/or the like. Alternatively, the vehicle computing system 606 may identify a constraint associated with the fault and cause the vehicle to be controlled according to the constraint, as described above.

In examples in which the fault 610 is detected during autonomous operation (e.g., semi-autonomous, fully autonomous, etc.) and the vehicle computing system 606 determines to cease operation (e.g., control the vehicle to the stopped location), the vehicle computing system may generate and send one or more AI constraint signals, such as AI constraint signal(s) 134 to an AI controller, such as AI controller 110. The AI constraint signal(s) may include an instruction to identify the stopped location and/or a stop trajectory for the vehicle 602 to travel to the stopped location. The stop trajectory may include a trajectory from a current location of the vehicle 602 to a stopped location. In various examples, based on the AI constraint signal(s), the AI controller may provide one or more trajectory and/or control signals to the vehicle computing system 606, to cause the vehicle 602 to be controlled to the stopped location.

In examples in which the fault 610 is detected during manual operations, the vehicle computing system 606 may determine whether the fault 610 is associated with a manual mode of operation. For example, a fault associated with a power mode may be associated both the manual mode of operation and the autonomous mode of operation. For another example, a fault associated with an AI control component may not be associated with the manual mode of operation. Based on a determination that the fault 610 is associated with a current mode of operation (e.g., in the manual mode) and a determination to cease operation, the vehicle computing system 606 may cause the operator to control the vehicle to the stopped location. In various examples, the vehicle computing system 606 may cause a presentation of a fault message to be presented on a display, the fault message indicating that further operation of the vehicle is not authorized. In some examples, the vehicle computing system 606 may send a control signal to a motor or other drive system to cause the vehicle to cease operations. In such examples, the operator may manually control the vehicle to the stopped location with remaining momentum.

At operation 614, the vehicle computing system 606 receives a request to enter a recovery mode associated with an operation (or function) of the vehicle. In some examples, the request may be received while the vehicle is operating according to a constraint based on the fault. In such examples, the vehicle may be at the stopped location, or moving through the environment according to a constrained or limited operation. In various examples, the request may be received from a computing system 616 that is independent of, but connected to, the vehicle computing system 606. The computing system 616 may be connected to the vehicle computing system 606 via a wired and/or wireless connection. In various examples, the computing system 616 may include a remote computing system, such as a computing system configured to remotely monitor vehicle operations and/or provide control inputs (e.g., constraints) associated therewith. In some examples, the vehicle computing system 606 may be configured to provide, to the computing system 616, data associated with the fault 610, determined constraint, the stopped location, and/or the stop trajectory. That is, the vehicle computing system 606 may provide data associated with a determination to cease operation of the vehicle 602.

In some examples, the computing system 616 may include a computing system associated with an operator of the vehicle, such as one configured with a vehicle control application. The operator may include an operator that is physically present in or on the vehicle 602, operator proximate the vehicle (e.g., line of sight control, over-the-horizon control, etc.) and providing control inputs via a controller, and/or a remote operator (e.g., teleoperator). In some examples, the request may be received, from the computing system 616, via a first request signal 618 and/or a second request signal 620. In some examples, the first request may include a single request, such as from a computing system 616 that is configured to automatically and remotely facilitate vehicular operation, to enter the recovery mode. In some examples, the first request signal 618 may include a first request to arm the recovery mode and a second request signal 620 may include a second request to activate the recovery mode. In such examples, the first request signal 618 and the second request signal 620 may, in combination, include the request to enter the recovery mode.

At operation 622, the vehicle computing system 606 determines whether the request to enter the recovery mode is valid. In various examples, the vehicle computing system 606 may initially determine whether the recovery mode is valid based on a determination that the fault 610 and/or associated constraint is associated with the recovery mode. That is, the vehicle computing system 606 may determine whether a recovery mode of operation is authorized with the fault 610 and/or type of constraint that resulted in ceasing or limiting operation of the vehicle 602 (e.g., based on the constraint). As non-limiting examples, the type of constraints may include speed constraints, acceleration constraints, turn radius constraints, vehicle trajectory constraints, direction of travel constraints, drivetrain constraints, mission constraints, power constraints, (passive) collision response system constraints, and/or the like.

In at least one example, the vehicle computing system 606 may determine that the request is valid based on a determination that a fault 610 and/or constraint is not associated with a failure mode of the vehicle. The failure mode may include a power limitation (e.g., inhibited from maintaining high voltage) and/or a constraint that no missions are allowed (e.g., drive gear disabled). That is, the failure mode may be a vehicle state that includes no authorized further movement in any mode of operation, such as due to safety or other considerations. In at least one example, the vehicle computing system 606 may determine that the request is valid based on a determination that the fault 610 and/or constraint is unrelated to the safe operation of the vehicle (e.g., not a safety-related constraint). As such, the vehicle computing system 606 may determine that the vehicle may be safely operated, in a limited capacity, to a location for maintenance.

In various examples, such as when the request is received from an operator of the vehicle, the vehicle computing system 606 determines validity of the request based in part on a period of time between the first request signal 618 and the second request signal 620. In some examples, the vehicle computing system 606 determines that the request is valid based on a determination that the operator submitted a first input (e.g., caused the first request signal 618 to be sent) to arm the recovery mode and a second input (e.g., caused the second request signal 620 to be sent) to activate the recovery mode within a threshold period of time (e.g., 1 second, 3 seconds, 5 seconds, etc.). That is, the request may be validated based on a determination that the first request signal 618 and the second request signal 620 are received within the threshold period of time of one another.

In various examples, the vehicle computing system 606 may determine whether the request is valid based on a verification of the source of the request. In various examples, the request to enter the recovery mode may include a unique identification code and/or token associated with the computing system 616. In such examples, the vehicle computing system 606 may validate the request based on a verification that the unique identification code and/or token is associated with a source that is authorized to request entry into the recovery mode. As such, the vehicle computing system 606 may be configured to prevent unauthorized parties from remotely controlling the vehicle.

Based on a determination that the request is valid ("Yes" at operation 622), the vehicle computing system, at operation 624, causes the vehicle to be controlled according to the recovery mode. In various examples, the vehicle computing system 606 may apply one or more constraints on vehicular operation in the recovery mode, such as to ensure that the vehicle 602 operates within the parameters of the recovery mode. In such examples, the vehicle computing system 606 modifies the constraints applied to vehicular operation based on the recovery mode (e.g., in lieu of the constraint associated with the fault that caused the vehicle to be controlled to the stopped location).

In some examples, the vehicle computing system may additionally apply one or more other constraints on vehicular operations, based on detected fault(s). For example, the vehicle computing system may identify a first fault that results in controlling the vehicle to a stopped location and a second fault associated with a direction of the vehicle (e.g., enabling motion in a single direction). Based on a determination that a request to enter the recovery mode is valid, the vehicle computing system may effectively ignore the first fault, enabling continued operation of the vehicle in the recovery mode, and may apply the second fault, causing the vehicle to be controlled according to the recovery mode in a single direction. In various examples, the vehicle computing system 606 may cause the vehicle to be controlled to a maintenance facility or other location for vehicle recovery.

In various examples, the vehicle computing system may be configured to receive updated data (e.g., updated fault data, AI constraint data, motion control diagnostic data, etc.) and identify one or more new faults associated with one or more components of the vehicle, while the vehicle is operating in the recovery mode. In some examples, the vehicle computing system may be configured to determine that the faults and/or constraints associated therewith are not associated with the recovery mode. In such examples, based on a determination that the faults and/or constraints are not associated with the recovery mode, the vehicle computing system may withhold data associated with the faults and/or constraints from vehicle control considerations. In some examples, the vehicle computing system may flag the faults and/or constraints, such as for application (e.g., generating control signals based thereon) at a time that the vehicle computing system switches back to the normal mode. For example, the vehicle computing system may determine that a new fault is detected in association with a planner system configured to facilitate autonomous operation. The vehicle computing system may determine that the new fault is not associated with the recovery mode and may withhold data associated with the new fault from vehicle control considerations. The vehicle computing system may additionally flag the new fault, such as for application upon re-entry into (e.g., engagement of) the normal mode.

In some examples, the vehicle computing system may additionally identify a new fault and/or constraint and determine that it does apply to the recovery mode. In some examples, based on a determination that the fault and/or constraint applies to the recovery mode, the vehicle computing system may generate and send a control signal to one or more components of the vehicle based on the fault and/or constraint. In some examples, based on the determination that the fault and/or constraint applies to the recovery mode, the vehicle computing system may cause the vehicle to be controlled to a stopped location, such as to cease operation. In some examples, the vehicle computing system may, based on the new fault and/or constraint, determine to automatically alter operation to the normal mode of operation. In such examples, the vehicle computing system may cause the vehicle to be controlled to a stopped location according to the normal mode of operation.

Based on a determination that the request is invalid ("No" at operation 622), the vehicle computing system, at operation 626, causes the vehicle to be controlled according to a normal mode of operation. The normal mode of operation may include a mode of operation in which the vehicle computing system 606 identifies faults 610 and constraints associated therewith, and causes the vehicle to be controlled according to the faults 610 and associated constraints. In at least one example, controlling the vehicle in the normal mode of operation may include continuing to maintain the vehicle 602 at the stopped location (e.g., not allowing continued operation of the vehicle 602).

As described above and below with respect to FIG. 7, the vehicle computing system 606 may cause the vehicle to be controlled in the recovery mode until a threshold period associated with recovery mode operation is reached and/or the vehicle computing system 606 receives a second request to exit the recovery mode.

At operation 628, the vehicle computing system 606 may optionally (illustrated by the dashed line between operation

626 and 628) cause an error notification 630 to be presented via the computing system 616. In various examples, the error notification 630 may provide an indication to the operator that the request was invalid and/or that the recovery mode is not available (e.g., an indication of denial of the request to enter the recovery mode). In the illustrative example, the error notification includes "ERROR: RECOVERY MODE DISABLED, FAULT DETECTED," however, this is merely for illustrative purposes and is not intended to be so limiting. In various examples, error notification 630 may include additional or alternative information, such as details about the fault 610, the constraint, a fault with the request (e.g., threshold time exceeded between the first request signal 618 and the second request signal 620) and/or a reason why the recovery mode is disabled.

Figure 7:
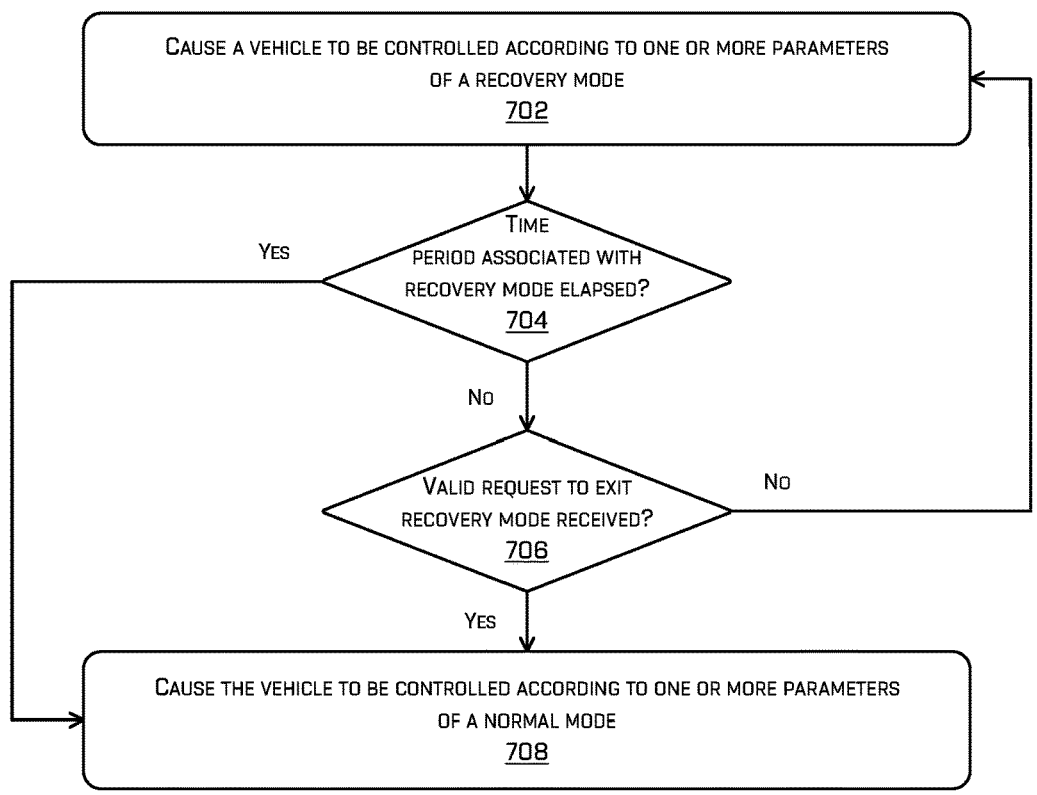
FIG. 7 depicts an example process for determining whether to transition from a recovery mode to a normal mode of operation, in accordance with examples of this disclosure.

FIG. 7 depicts an example process 700 for determining whether to transition from a recovery mode to a normal mode of operation, in accordance with examples of this disclosure.

At operation 702, a vehicle computing system (e.g., motion controller 104) causes a vehicle to be controlled according to one or more parameters of a recovery mode (of operation). The parameter(s) may include limits on speed, acceleration, turn radius (e.g., steering angle), trajectory, vehicle mission, direction of travel, power, drivetrain, and/or the like. In at least one example, the parameter(s) may limit operation of the vehicle, such as to enable the vehicle to be controlled to a maintenance facility or other location for vehicle recovery. In various examples, the vehicle computing system may apply one or more constraints on the vehicle based on the parameters. In such examples, the vehicle computing system may generate and send constraint signals, such as motion control constraint signals 132, AI constraint signals 134, and the like, to cause the vehicle to be controlled according to the parameter(s) of the recovery mode.

At operation 704, the vehicle computing system determines whether a time period associated with the recovery mode has elapsed. The time period (e.g., 5 minutes, 10 minutes, 15 minutes, etc.) may include a threshold time period associated with operating in the recovery mode. In some examples, time period may be a pre-determined time period associated with the recovery mode. In such example, the time period may be programmed into the vehicle computing system. In some examples, the vehicle computing system may be configured to determine a time period associated with the recovery mode based on a fault detected and/or constraint that resulted in the vehicle ceasing operation and/or entering the recovery mode.

Based on a determination that the time period has not elapsed ("No" at 704), the vehicle computing system, at operation 706, determines whether a valid request to exit the recovery mode has been received. In some examples, the vehicle computing system may determine that the request to exit the recovery mode is valid based on a determination that a first input to deactivate the recovery mode (e.g., arm the normal mode) is received within a first threshold time period of a second input to activate the normal mode. The first threshold time period may be the same or different as a second threshold time period associated with activating the recovery mode, as described above.

Based on a determination that a valid request to exit the recovery mode is not received ("No" at operation 706), the vehicle computing system causes the vehicle to be controlled according to the parameter(s) of the recovery mode, as described with respect to operation 702.

Based on a determination that the valid request to exit the recovery mode is received ("Yes" at operation 706) and/or that the time period has elapsed ("Yes" at operation 704), the vehicle computing system, at operation 708, causes the vehicle to be controlled according to one or more parameters of a normal mode (e.g., vehicle computing device switches from the recovery mode to the normal mode). The normal mode of operation, as described above, may include a mode in which the vehicle is operated according to one or more constraint(s) identified by the vehicle computing system. That is, in the normal mode of operation, the vehicle computing system may identify faults (or determine that no faults are present) in one or more components of the vehicle, and may control the vehicle based on constraints associated with the faults and/or constraints associated with operational parameters (e.g., non-fault based constraint on vehicular operation) as set by an operator or computing system. For example, based on a determination that a fault associated with ceasing operation of the vehicle still exists (e.g., has not been cleared by maintenance personnel), the vehicle computing system may cause the vehicle to be controlled to and maintain a stopped location.

In some examples, a previously reported fault may not be cleared without external input, such as from maintenance personnel. In such examples, the vehicle computing system, in response to determining to activate the normal mode, may be controlled to maintain the stopped location until the fault is cleared by the external input. In some examples, the external input may be received from a remote computing device (e.g., computing system(s) 118, computing systems 616, etc.), such as to enable an operator in the vehicle or remote from the vehicle, to clear the fault and/or constraint after analyzing one or more fault codes, vehicle components, and/or the like.

In some examples, the vehicle computing system may be configured to clear a previously reported fault. In such examples, the vehicle computing system may be configured to run diagnostic tests on the vehicle and/or components thereof to determine that the component that previously reported the fault resulting in the constraint is no longer faulted. In such examples, the vehicle computing system may be configured to automatically test and restore a normal mode of operation of the vehicle without external input from an operator and/or maintenance personnel.

In various examples, the vehicle computing system may modify operation of the vehicle from the recovery mode to the normal mode based on a valid request and/or an expiration of the time period associated with the recovery mode to ensure that continued operations in the recovery mode do not occur. That is, the vehicle computing system may ensure that the vehicle is not inadvertently operated in the recovery mode of operation. Additionally, the time period associated with the recovery mode prevents excessive operation of the vehicle in the faulted state, thereby preventing potential additional, cascading faults. As such, the vehicle computing system may ensure the safe operation of the vehicle.

Figure 8:
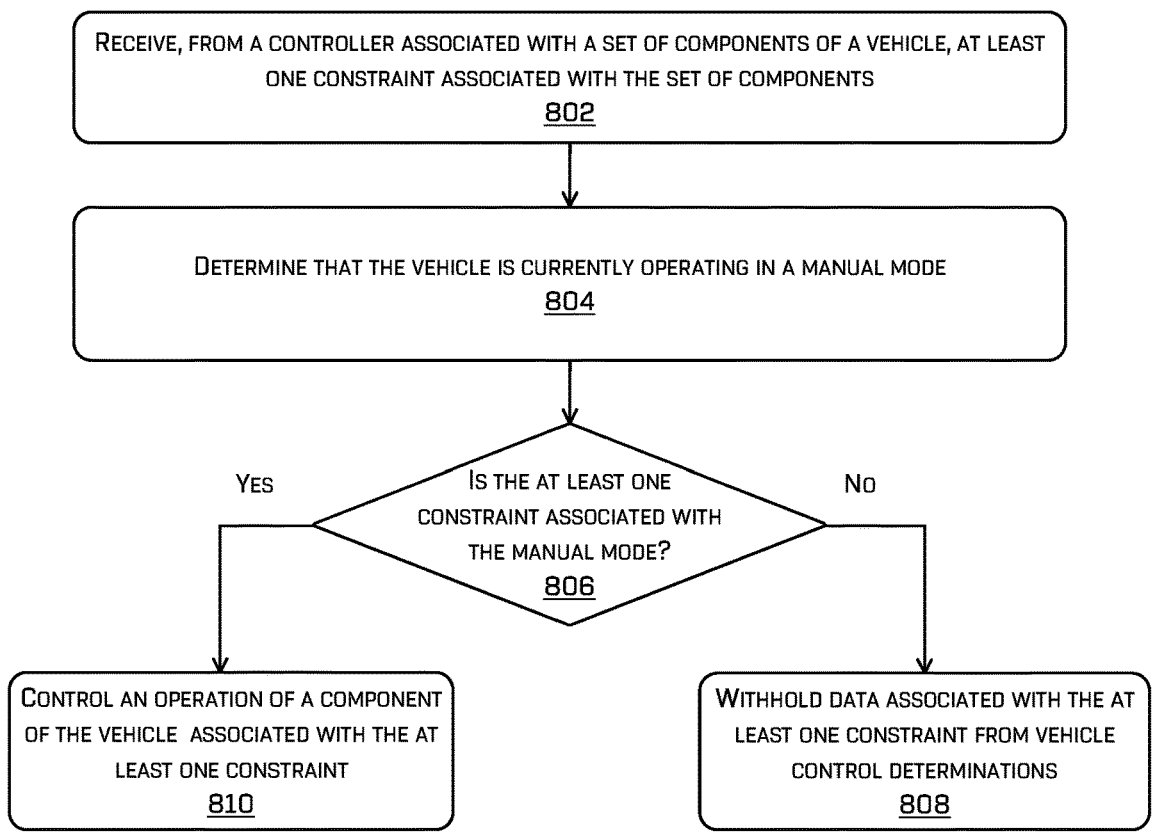
FIG. 8 depicts an example process for determining whether to constrain an operation of a vehicle during manual operation of the vehicle, in accordance with examples of this disclosure.

FIG. 8 depicts an example process 800 for determining whether to constrain an operation (or function) of a vehicle during manual operation of the vehicle, in accordance with examples of this disclosure. The manual operation may include an input or influence by an operator, such as to assist in controlling at least a portion of the operation or function of the vehicle.

At operation 802, the vehicle computing system (e.g., motion controller 104) receives, from a controller associated with a set of components of a vehicle, at least one constraint associated with the set of components. In at least one example, the controller may include a controller associated with autonomous operation of the vehicle (e.g., AI controller 110). That is, the controller may be configured to process sensor data representative of an environment in which the vehicle operates, and determine one or more trajectories for the vehicle to track based on the sensor data. In various examples, the set of components may include one or more components configured to perform one or more functions associated with the autonomous operation of the vehicle (e.g., perception component, planner component, etc.).

In various examples, the controller may be configured to receive diagnostic data (e.g., AI component diagnostic data 122) associated with the set of components. In some examples, the diagnostic data may include a state of each component of the set of components. In some examples, the diagnostic data may additionally include state data associated with the sensor(s) configured to provide sensor data to respective components of the set of components. In at least one example, the diagnostic data may include a fault associated with a component of the set of components and/or a sensor associated with the set of components.

In various examples, the controller may be configured to process the diagnostic data and determine one or more constraints to apply to vehicular operation. The constraints may include constraints to apply to one or more components of the set of components and/or constraints to apply to the overall operation of the vehicle (e.g., maximum speed, mission degradation, etc.). In various examples, the controller may be configured to provide the at least one constraint to the vehicle computing system as AI constraint data, such as AI constraint data 120. In some examples, the at least one constraint may include an aggregation of two or more constraints to apply to vehicular operation, as determined by the controller.

At operation 804, the vehicle computing system determines that the vehicle is currently operating in a manual mode. The manual mode of operation may include a manually assisted mode of operation that includes human input to influence at least one control determination associated with vehicular operations. In some examples, the manual mode of operation may include an operator located physically in or on the vehicle, and/or proximate the vehicle (e.g., with a remote device configured for vehicular control) and configured to input one or more control signals to cause the vehicle to be controlled, at least in part, based on the control signal(s). In such examples, the operator may manually manipulate one or more controls of the vehicle or a controller, such as to cause the vehicle to operator according to control movements (e.g., control signals associated with movement of the control(s)).

In some examples, the manual mode of operation may include an operator located remote from the vehicle (e.g., teleoperator) and configured to provide control signal(s) to assist in controlling the vehicle. In such examples, the operator (e.g., teleoperator) may provide control signal(s) that are consumed in whole, or in part, by an AI controller (e.g., AI controller 110). That is, the control signal(s) provided by the teleoperator may cause the AI controller 110 to generate one or more AI control signals 128 and/or AI constraint(s) signal(s) 120. In at least one example, the operator (e.g., physical operator, remote-controlled operator, teleoperator, etc.) may provide control inputs via an operator computing device (e.g., computing system(s) 118, computing system 616, etc.) and/or a vehicle control application.

At operation 806, the vehicle computing system determines whether the at least one constraint is associated with the manual mode of operation. As discussed above, the controller may be configured to identify constraints associated with autonomous operation and constraints associated with the overall operation of the vehicle. In various examples, the constraints associated with autonomous operation may include limitations on a portion of the set of components that are associated with autonomous operation, but not necessarily the manual operation. For example, the controller may identify a constraint for the vehicle to not make lane changes or turns to the right while operating in the autonomous mode due to a degraded performance of a sensor on the right side of the vehicle. In some examples, the vehicle computing system may identify the constraints associated with the autonomous mode based at least in part on a tag or indicator associated with a corresponding fault. In such examples, the fault may be tagged or otherwise include an indication that the fault is associated with autonomy and/or is not associated with the manual mode. For example, a fault associated with a planner system may include a tag that indicates that autonomy is required (e.g., autonomy required: true) to apply the fault and/or associated constraint to vehicular operations. In examples in which the fault and/or constraint is identified as being associated with autonomy, the vehicle computing system may determine that the at least one constraint is not associated with the manual mode. In various examples, the vehicle computing system may store an indication of the fault and/or the constraint that is associated with autonomy, such as for an evaluation of performance of vehicle components.

In various examples, the controller may include, with the at least one constraint, an indication that the at least one constraint applies to autonomous operation of the vehicle. In such examples, the vehicle computing system may determine that the at least one constraint does not apply to the manual mode of operation. In some examples, the controller may be configured to process the at least one constraint and determine whether the at least one constraint applies to the manual mode of operation. In some examples, the vehicle computing system may determine whether the at least one constraint is associated with a table of constraints associated with the manual mode, such as that stored in a database associated with the vehicle computing system. In some examples, the vehicle computing system may determine whether the at least one constraint is associated with the manual mode by sending a query to a remote computing device configured to monitor vehicular operations. In such examples, the remote computing device may send a response to the query, informing the vehicle computing device as to whether the at least one constraint is associated with the manual mode.

Based on a determination that the at least one constraint is not associated with the manual mode ("No" at operation 806), the vehicle computing system, at operation 808, withholds data associated with the at least one constraint from vehicle control determinations. That is, the vehicle computing system refrains from limiting an operation of the vehicle based on the at least one constraint.

Based on a determination that the at least one constraint is associated with the manual mode ("Yes" at operation 806), the vehicle computing system, at operation 810, controls an operation of a component of the vehicle associated with the at least one constraint. In various examples, the vehicle computing system may generate and send a constraint signal to the controller, such as to control the operation of the component. In response to the constraint signal, controller may send an AI control signal, such as AI control signal 128, to the component(s) associated with the at least one constraint. Based on the AI control signal, the operation of the component may be limited, such as to operate within the parameters of the at least one constraint.

Figure 9:
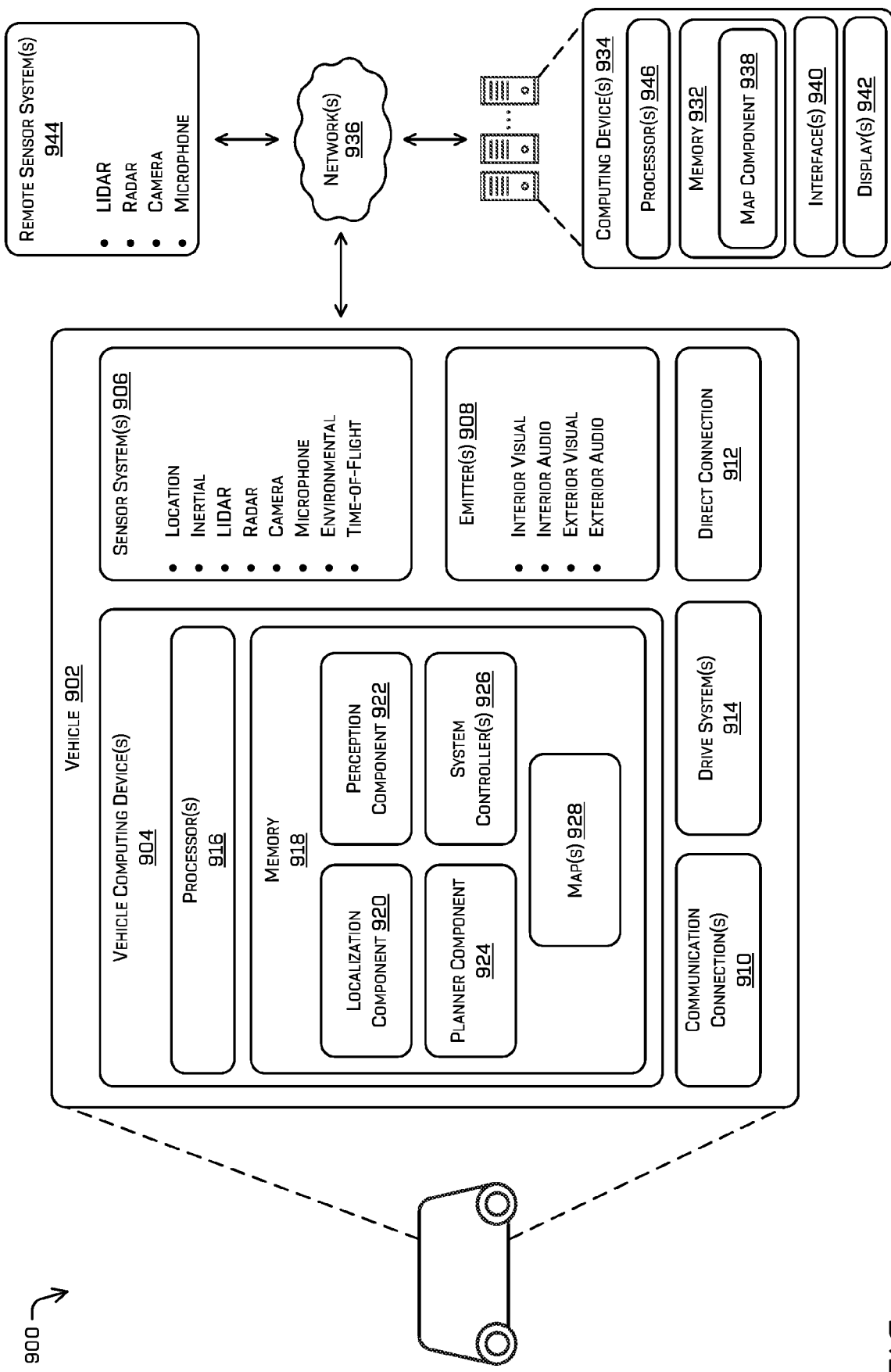
FIG. 9 is a block diagram of an example system for implementing the techniques described herein.

FIG. 9 is a block diagram of an example system 900 for implementing the techniques described herein. In at least one example, the system 900 may include a vehicle 902, such as vehicle 602. The vehicle 902 may include one or more vehicle computing devices 904, one or more sensor systems 906, one or more emitters 908, one or more communication connections 910, at least one direct connection 912, and one or more drive systems 914.

The vehicle computing device(s) 904 may include one or more processors 916 and memory 918 communicatively coupled with the one or more processors 916. In the illustrated example, the vehicle 902 is an autonomous vehicle; however, the vehicle 902 could be any other type of vehicle, such as a semi-autonomous vehicle, or any other system having at least an image capture device (e.g., a camera enabled smartphone). In the illustrated example, the memory 918 of the vehicle computing device(s) 904 stores a localization component 920, a perception component 922, a planner component 924, one or more system controllers 926, and one or more maps 928. Though depicted in FIG. 9 as residing in the memory 918 for illustrative purposes, it is contemplated that the localization component 920, a perception component 922, a planner component 924, one or more system controllers 926, and one or more maps 928 may additionally, or alternatively, be accessible to the vehicle 902 (e.g., stored on, or otherwise accessible by, memory remote from the vehicle 902, such as, for example, on memory 932 of one or more computing devices 934). Additionally, though illustrated as separate components within the memory 918, it is understood that one or more components may be associated with and include a sub-section of other components. For example, a first system controller 926 may be an AI controller and may include or may be coupled to one or more of the localization component 920, the perception component 922, the planner component 924, and/or the like. That is, the first system controller 926 may be configured to perform functions of an autonomous controller, to enable autonomous operation of the vehicle 902.

In at least one example, the localization component 920 may include functionality to receive data from the sensor system(s) 906 to determine a position and/or orientation of the vehicle 902 (e.g., one or more of an x-, y-, z-position, roll, pitch, or yaw). The sensor system(s) 906 may include vision sensors (e.g., cameras, lidar, radar, etc.), inertial sensors (e.g., IMU, wheel encoder, etc.), location sensors (e.g., GPS, etc.), and/or the like. In some examples, the localization component 920 may additionally determine the position and/or orientation of the vehicle 902 based on map data from the map(s) 928. For example, the localization component 920 may include and/or request/receive a map of an environment, such as from map(s) 928, and may continuously determine a location and/or orientation of the autonomous vehicle within the map. In some instances, the localization component 920 may utilize SLAM (simultaneous localization and mapping), CLAMS (calibration, localization and mapping, simultaneously), relative SLAM, bundle adjustment, nonlinear least squares optimization, or the like to receive image data, lidar data, radar data, IMU data, GPS data, wheel encoder data, and the like to accurately determine a location of the autonomous vehicle. In some instances, the localization component 920 may provide data to various components of the vehicle 902 to determine an initial position of an autonomous vehicle for determining the relevance of an object to the vehicle 902, as discussed herein.

In some examples, the perception component 922 may include functionality to perform object detection, segmentation, and/or classification. In some examples, the perception component 922 may provide processed sensor data that indicates a presence of an object (e.g., entity) that is proximate to the vehicle 902 and/or a classification of the object as an object type (e.g., car, pedestrian, cyclist, animal, building, tree, road surface, curb, sidewalk, unknown, etc.). In some examples, the perception component 922 may provide processed sensor data that indicates a presence of a stationary entity that is proximate to the vehicle 902 and/or a classification of the stationary entity as a type (e.g., building, tree, road surface, curb, sidewalk, unknown, etc.). In additional or alternative examples, the perception component 922 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition, an indication of darkness/light, etc.

In general, the planner component 924 may determine a path for the vehicle 902 to follow to traverse through an environment. For example, the planner component 924 may determine various routes and vehicle trajectories and various levels of detail. For example, the planner component 924 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 924 may generate an instruction for guiding the vehicle 902 along at least a portion of the route from the first location to the second location. In at least one example, the planner component 924 may determine how to guide the autonomous vehicle from a first waypoint in the sequence of waypoints to a second waypoint in the sequence of waypoints. In some examples, the instruction may be a vehicle trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 902 to navigate.

In various examples, the planner component 924 may include a prediction component that is configured to predict one or more predicted object trajectories associated with a detected object in an environment, such as based on sensor data. The predicted object trajectories may be determined using a probabilistic heat map (e.g., discretized probability distribution) to predict object behavior. In some examples, the one or more predicted object trajectories may be based on a top-down representation of an environment of the vehicle 902. In various examples, the one or more predicted object trajectories may be determined utilizing tree search methods, temporal logic formulae, and/or machine learning techniques. In various examples, the planner component 924 may utilize the predicted object trajectories, other object data, and/or the top-down representation of the environment to control the vehicle 902.

In at least one example, the vehicle computing device(s) 904 may include one or more system controllers 926 (e.g., motion controller 104, AI controller 110, etc.), which may be configured to control steering, propulsion, braking, safety, emitters, communication, and other systems of the vehicle 902. The system controller(s) 926 may communicate with and/or control corresponding systems of the drive system(s) 914 and/or other components of the vehicle 902.

The memory 918 may further include one or more maps 928 that may be used by the vehicle 902 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 902 may be controlled based at least in part on the map(s) 928. That is, the map(s) 928 may be used in connection with the localization component 920, the perception component 922, and/or the planner component 924 to determine a location of the vehicle 902, detect objects in an environment, generate routes, determine actions and/or trajectories to navigate within an environment.

In some examples, the one or more maps 928 may be stored on a remote computing device(s) (such as in a map component 938 of the computing device(s) 934) accessible via one or more networks 936. In some examples, multiple maps 928 may be stored based on, for example, a characteristic (e.g., type of entity, time of day, day of week, season of the year, etc.). Storing multiple maps 928 may have similar memory requirements, but increase the speed at which data in a map may be accessed.

As can be understood, the components discussed herein (e.g., the localization component 920, the perception component 922, the planner component 924, the one or more system controllers 926, and the one or more maps 928 are described as divided for illustrative purposes. However, the operations performed by the various components may be combined or performed in any other component. In various examples, as described herein the controller may include one or more of the localization component 920, the perception component 922, the planner component 924, the one or more system controllers 926, and the one or more maps 928, such as to process data associated with each component and control the vehicle based in part on the data.

In some instances, aspects of some or all of the components discussed herein may include any models, techniques, and/or machine learning techniques. For example, in some instances, the components in the memory 918 (and the memory 932, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In various examples, the computing device(s) 934 may include one or more input/output (I/O) devices, such as via one or more interfaces 940. The interface(s) 940 may include I/O interfaces and/or network interfaces. The network interface(s) may include one or more interfaces and hardware components for enabling communication with various other devices over the network or directly. For example, network interface(s) may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The I/O interface(s) may include speakers, a microphone, a camera, and various user controls (e.g., buttons, a joystick, a keyboard, a keypad, etc.), a haptic output device, and so forth. In at least one example, the I/O interface may include one or more user interfaces associated with a vehicle operation application, such as to enable a user to input one or more constraints associated with operation of the vehicle 902, as described above with regard to FIG. 5. In some examples, a user may view the user interface(s) associated with the vehicle operation application via one or more displays 942. Depending on the type of computing device, such as a user computing device, server computing device, or the like, the display 942 may employ any suitable display technology. For example, the display 942 may be a liquid crystal display, a plasma display, a light emitting diode display, an OLED (organic light-emitting diode) display, an electronic paper display, or any other suitable type of display able to present digital content thereon. In some examples, the display 942 may have a touch sensor associated with the display 942 to provide a touchscreen display configured to receive touch inputs for enabling interaction with a graphical user interface presented on the display 942. Accordingly, examples herein are not limited to any particular display technology.

The vehicle 902 may also include one or more emitters 908 for emitting light and/or sound. The emitters 908 may include interior audio and visual emitters to communicate with passengers of the vehicle 902. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 908 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 902 may also include one or more communication connections 910 that enable communication between the vehicle 902 and one or more other local or remote computing device(s). For instance, the communication connection(s) 910 may facilitate communication with other local computing device(s) on the vehicle 902 and/or the drive system(s) 914. Also, the communication connection(s) 910 may allow the vehicle to communicate with other computing device(s) (e.g., computing device(s) 934, other nearby vehicles, etc.).

The communications connection(s) 910 may include physical and/or logical interfaces for connecting the vehicle computing device(s) 904 to another computing device or a network, such as network(s) 936. For example, the communications connection(s) 910 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s) 934.

In at least one example, the vehicle 902 may include one or more drive systems 914. In some examples, the vehicle 902 may have a single drive system 914. In at least one example, if the vehicle 902 has multiple drive systems 914, individual drive systems 914 may be positioned on opposite ends of the vehicle 902 (e.g., the front and the rear, etc.). In at least one example, the drive system(s) 914 may include one or more sensor systems to detect conditions of the drive system(s) 914 and/or the surroundings of the vehicle 902. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 914. In some cases, the sensor system(s) on the drive system(s) 914 may overlap or supplement corresponding systems of the vehicle 902 (e.g., sensor system(s) 906).

The drive system(s) 914 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 914 may include a drive system controller (e.g., motion controller 104, a system controller 926, etc.) which may receive and preprocess data from the sensor system(s) and to control operation of the various vehicle systems. In some examples, the drive system controller may include one or more processors and memory communicatively coupled with the one or more processors, such as to perform operations described above with regard to FIGS. 1-8. The memory may store one or more systems to perform various functionalities of the drive system(s) 914. Furthermore, the drive system(s) 914 may also include one or more communication connection(s) that enable communication by the respective drive module with one or more other local or remote computing device(s).

In at least one example, the direct connection 912 may provide a physical interface to couple the one or more drive system(s) 914 with the body of the vehicle 902. For example, the direct connection 912 may allow the transfer of energy, fluids, air, data, etc. between the drive system(s) 914 and the vehicle. In some instances, the direct connection 912 may further releasably secure the drive system(s) 914 to the body of the vehicle 902.

In at least one example, the localization component 920, the perception component 922, the planner component 924, the one or more system controllers 926, and the one or more maps 928, may process data (e.g., sensor data, simulation data), as described above, and may send their respective outputs, over the one or more network(s) 936, to the computing device(s) 934. In at least one example, the localization component 920, the perception component 922, the planner component 924, the one or more system controllers 926, and the one or more maps 928, may send their respective outputs to the computing device(s) 934 at a particular frequency, after a lapse of a predetermined period of time, in near real-time, etc. In at least one example, the system controller(s) 926 may be configured to send constraint and diagnostic data to the computing device(s) 934. In various examples, the constraint and diagnostic data may be sent to the computing device(s) 934 in response to a determination to cease operation of the vehicle 902, such as that described above with regard to FIGS. 6 and 7.

In some examples, the vehicle 902 may send sensor data to the computing device(s) 934 via the network(s) 936. In some examples, the vehicle 902 may receive sensor data from the computing device(s) 934 and/or one or more remote sensor systems 944 via the network(s) 936. The sensor data may include raw sensor data and/or processed sensor data and/or representations of sensor data. In some examples, the sensor data (raw or processed) may be sent and/or received as one or more log files.

The computing device(s) 934 may include one or more processors 946 and a memory 932. The processor(s) 916 of the vehicle 902 and the processor(s) 946 of the computing device(s) 934 may be any suitable processor capable of executing instructions to process data and perform operations as described herein. By way of example and not limitation, the processor(s) 916 and 946 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 918 and 932 are examples of non-transitory computer-readable media. The memory 918 and 932 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 918 and 932 may include at least a working memory and a storage memory. For example, the working memory may be a high-speed memory of limited capacity (e.g., cache memory) that is used for storing data to be operated on by the processor(s) 916 and 946. In some instances, the memory 918 and 932 may include a storage memory that may be a lower-speed memory of relatively large capacity that is used for long-term storage of data. In some cases, the processor(s) 916 and 946 cannot operate directly on data that is stored in the storage memory, and data may need to be loaded into a working memory for performing operations based on the data, as discussed herein.

It should be noted that while FIG. 9 is illustrated as a distributed system, in alternative examples, components of the vehicle 902 may be associated with the computing device(s) 934 and/or components of the computing device(s) 934 may be associated with the vehicle 902. That is, the vehicle 902 may perform one or more of the functions associated with the computing device(s) 934, and vice versa.

EXAMPLE CLAUSES

A: A system associated with a first controller of a vehicle, the system comprising: one or more processors; and memory storing processor-executable instructions that, when executed by the one or more processors, configure the system to: receive first data associated with a first set of components of the vehicle; determine, based at least in part on the first data, a first constraint associated with an operation of the vehicle, wherein a constraint comprises a limitation on a parameter associated with the operation of the vehicle; receive, from a second controller associated with a second set of components of the vehicle, second data comprising an aggregation of constraints associated with the second set of components; identify a second constraint of the aggregation of constraints that is associated with the first constraint; and based at least in part on a comparison between the first constraint and the second constraint, control the vehicle according to at least one of the first constraint or the second constraint.

B: The system of paragraph A, wherein the second data further comprises diagnostics associated with operation of the second set of components, and the instructions further configure the system to: validate the second constraint based at least in part on the diagnostics.

C: The system of either paragraph A or paragraph B, wherein the second data further comprises diagnostics associated with operation of the second set of components, and the instructions further configure the system to: determine that the second constraint is invalid based at least in part on the diagnostics; and control the vehicle based at least in part on the first constraint.

D: The system of any one of paragraphs A-C, wherein the instructions further configure the system to: receive, from a remote computing device, a third constraint associated with the operation of the vehicle; and control the vehicle based at least in part on the third constraint.

E: The system of any one of paragraphs A-D, wherein controlling the vehicle according to the at least one of the first constraint or the second constraint comprises: sending a first control signal to the second controller, the first control signal configured to cause the second set of components to limit the operation of the vehicle according to the at least one of the first constraint or the second constraint; identifying a component of the first set of components that is associated with the first constraint or the second constraint; and sending a second control signal to the component to cause the component to limit the operation of the vehicle according to the at least one of the first constraint or the second constraint.

F: A method comprising: receiving first data associated with a first set of components of a vehicle; determining, based at least in part on the first data, a first constraint associated with an operation of the vehicle, wherein a constraint comprises a limitation on a parameter associated with the operation of the vehicle; receiving, from a controller associated with a second set of components of the vehicle, second data associated with the second set of components and comprising a second constraint associated with the operation of the vehicle; and controlling the vehicle according to at least one of the first constraint or the second constraint.

G: The method of paragraph F, further comprising determining that the first constraint and the second constraint are associated with a same type of constraint; determining that the first constraint is a more conservative constraint than the second constraint; and controlling the vehicle according to the first constraint.

H: The method of either paragraph F or paragraph G, wherein controlling the vehicle comprises: sending a first control signal to the controller, the first control signal configured to cause the second set of components to limit the operation of the vehicle according to the at least one of the first constraint or the second constraint; identifying a component of the first set of components that is associated with the at least one of the first constraint or the second constraint; and sending a second control signal to the component to cause the component to cause the component to limit the operation of the vehicle according to the at least one of the first constraint or the second constraint.

I: The method of any one of paragraphs F-H, wherein the second data further comprises diagnostics associated with operation of the second set of components, the method further comprising at least one of: determining that the second constraint is valid based at least in part on the diagnostics; and including the second constraint in a vehicle control determination; or determining that the second constraint is invalid based at least in part on the diagnostics; and withholding data associated with the second constraint from the vehicle control determination.

J: The method of any one of paragraphs F-I, further comprising: identifying a parameter associated with the operation of the vehicle; determining, based on the parameter, that the second constraint is invalid; and controlling the vehicle based on the first constraint.

K: The method of any one of paragraphs F-J, further comprising: identifying a component of the first set of components that is associated with the second constraint; determining a sub-constraint associated with the at least one of the first constraint or the second constraint based at least in part on the component; and generating a control signal associated with the component based at least in part on the sub-constraint.

L: The method of any one of paragraphs F-K, wherein the first constraint and the second constraint are associated with at least one of: a speed; an acceleration; a turn radius; a vehicle trajectory; a direction of travel of the vehicle; a drivetrain configuration of the vehicle; a mission of the vehicle; a voltage associated with an electric motor; or a passive collision response system.

M: The method of any one of paragraphs F-L, further comprising: determining a probability of fault associated with a component of the second set of components, the component being associated with the second constraint; and based at least in part on the probability of fault being at or above a threshold probability, withholding the second constraint from a vehicle control determination.

N: The method of any one of paragraphs F-M, further comprising: receiving, from a remote computing device, a third constraint associated with the operation of the vehicle; and controlling the vehicle based at least in part on the third constraint.

O: One or more non-transitory computer-readable media storing instructions that, when executed, cause one or more processors to perform operations comprising: receiving first data associated with a first set of components of a vehicle; determining, based at least in part on the first data, a first constraint associated with an operation of the vehicle, wherein a constraint comprises a limitation on a parameter associated with the operation of the vehicle; receiving, from a controller associated with a second set of components of the vehicle, second data associated with the second set of components and comprising a second constraint associated with the operation of the vehicle; and controlling the vehicle according to at least one of the first constraint or the second constraint.

P: The one or more non-transitory computer-readable media of paragraph O, the operations further comprising: determining that the first constraint and the second constraint are associated with a same type of constraint; determining that the first constraint is a more conservative constraint than the second constraint; and controlling the vehicle according to the first constraint.

Q: The one or more non-transitory computer-readable media of either paragraph O or paragraph P, wherein controlling the vehicle comprises: sending a first control signal to the controller, the first control signal configured to cause the second set of components to limit the operation of the vehicle according to the at least one of the first constraint or the second constraint; identifying a component of the first set of components that is associated with the at least one of the first constraint or the second constraint; and sending a second control signal to the component to cause the component to limit the operation of the vehicle according to the at least one of the first constraint or the second constraint.

R: The one or more non-transitory computer-readable media of any one of paragraphs O-Q, wherein the second data further comprises diagnostics associated with operation of the second set of components, the operations further comprising at least one of: determining that the second constraint is valid based at least in part on the diagnostics; and including the second constraint in a vehicle control determination; or determining that the second constraint is invalid based at least in part on the diagnostics; and withholding data associated with the second constraint from the vehicle control determination.

S: The one or more non-transitory computer-readable media of any one of paragraphs O-R, the operations further comprising: identifying a parameter associated with the operation of the vehicle; determining, based on the parameter, that the second constraint is invalid; and controlling the vehicle based on the first constraint.

T: The one or more non-transitory computer-readable media of any one of paragraphs O-S, the operations further comprising: receiving, from an operator of the vehicle, an input associated with an override of the at least one of the first constraint or the second constraint, the input comprising an indication of a manual operation of at least a portion of the vehicle; determining that the at least one of the first constraint or the second constraint is not associated with the manual operation of the at least the portion of the vehicle; and withholding data associated with the at least one of the first constraint or the second constraint from vehicle control determinations.

U: A system comprising: one or more processors; and memory storing processor-executable instructions that, when executed by the one or more processors, configure the system to: receive, during an operation of a vehicle in a normal mode, data associated with a fault of a component of a vehicle; based at least in part on the fault of the component, controlling the vehicle to a stopped location, wherein the stopped location is associated with a fault preventing the vehicle from moving; receive a request to enter a recovery mode associated with the operation of the vehicle, wherein the recovery mode comprises at least one parameter that is different from the normal mode and the recovery mode enables the vehicle to move under its own power; and based at least in part on a determination that the request to enter the recovery mode is valid, cause the vehicle to be controlled according to the recovery mode.

V: The system of paragraph U, wherein the instructions further configure the system to: receive, from an operator of the vehicle at a first time, a first input associated with arming the recovery mode; receive, from the operator of the vehicle at a second time after the first time, a second input associated with activating the recovery mode; and determine, based at least in part on the second time being within a threshold time period of the first time, that the request is valid.

W: The system of either paragraph U or paragraph V, wherein the vehicle enters the recovery mode at a first time and the instructions further configure the system to: determine that a current time is equal to or greater than a threshold period from the first time; and cause the vehicle to be controlled to a second stopped location according to the normal mode.

X: The system of any one of paragraphs U-W, wherein the instructions further configure the system to: receive, from an operator of the vehicle at a first time, a first input associated with disarming the recovery mode; receive, from the operator of the vehicle at a second time after the first time, a second input associated with deactivating the recovery mode; and based at least in part on the second time being within a threshold time period of the first time, cause the vehicle to be controlled to a second stopped location based at least in part on the fault.

Y: The system of any one of paragraphs U-X, wherein causing the vehicle to be controlled according to the recovery mode comprises at least one of enabling operation of the vehicle by an operator within parameters of the recovery mode; or controlling the vehicle according to the parameters of the recovery mode.

Z: A method comprising: receiving data associated with a fault of a component of a vehicle operating in an environment; based at least in part on the fault of the component, controlling the vehicle to a stopped location, wherein the stopped location is associated with ceasing self-propelled movement of the vehicle in the environment; receiving a request to enter a recovery mode associated with a continued operation of the vehicle; and based at least in part on a determination that the request to enter the recovery mode is valid, controlling the vehicle according to the recovery mode.

AA: The method of paragraph Z, further comprising: receiving, from an operator of the vehicle at a first time, a first input associated with arming the recovery mode; receiving, from the operator of the vehicle at a second time after the first time, a second input associated with activating the recovery mode; and determining, based at least in part on the second time being within a threshold time period of the first time, that the request is valid.

AB: The method of either paragraph Z or paragraph AA, wherein the vehicle enters the recovery mode at a first time, the method further comprising: determining that a current time is equal to or greater than a threshold time period from the first time; and causing the vehicle to be controlled to a second stopped location according to the normal mode.

AC: The method of any one of paragraphs Z-AB, further comprising: receiving, at the second stopped location, a second request to enter the recovery mode, the second request comprising: a first input associated with arming the recovery mode; and a second input associated with activating the recovery mode; based at least in part on a determination that a time period between the first input and the second input meets or exceeds the threshold time period, determining that the second request is invalid; and based at least in part on determining that the second request is invalid, causing the vehicle to maintain the second stopped location.

AD: The method of any one of paragraphs Z-AC, further comprising: receiving, from an operator of the vehicle at a first time, a first input associated with disarming the recovery mode; receiving, from the operator of the vehicle at a second time after the first time, a second input associated with deactivating the recovery mode; and based at least in part on the second time being within a threshold time period of the first time, causing the vehicle to be controlled to a second stopped location according to a normal mode of operation.

AE: The method of any one of paragraphs Z-AD, further comprising: while the vehicle is operating in the recovery mode, identifying a second fault associated with a second component of the vehicle; determining that a constraint associated with the second fault is associated with the normal mode; and withholding data associated with the constraint from vehicle control considerations associated with the recovery mode.

AF: The method of any one of paragraphs Z-AE, wherein the request is received from a computing device associated with the vehicle that is configured to facilitate autonomous operation of the vehicle, the method further comprising: determining that at least one of the component or the fault is associated with the recovery mode; and determining that the request is valid based at least in part determining that the at least one of the component or the fault is associated with the recovery mode.

AG: The method of any one of paragraphs Z-AF, further comprising: determining, based at least in part on the fault, a type of constraint on an operation of the vehicle; and at least one of determining that the request is valid based on a determination that the type of constraint is associated with the recovery mode; or determining that the request is invalid based on a determination that the type of constraint is associated with a failure mode.

AH: The method of paragraph AG, wherein the type of constraint comprises at least one of a speed; an acceleration; a turn radius; a vehicle trajectory; a direction of travel of the vehicle; a drivetrain configuration of the vehicle; a mission of the vehicle; a voltage associated with an electric motor; or a passive collision response system.

AI: One or more non-transitory computer-readable media storing instructions that, when executed, cause one or more processors to perform operations comprising: receiving data associated with a fault of a component of a vehicle operating in an environment; based at least in part on the fault of the component, controlling the vehicle to a stopped location, wherein the stopped location is associated with ceasing the operation of the vehicle in the environment receive a request to enter a recovery mode associated with a continued operation of the vehicle; and based at least in part on a determination that the request to enter the recovery mode is valid, control the vehicle according to the recovery mode.

AJ: The one or more non-transitory computer-readable media of paragraph AI, the operations further comprising: receiving, from an operator of the vehicle at a first time, a first input associated with arming the recovery mode; receiving, from the operator of the vehicle at a second time after the first time, a second input associated with activating the recovery mode; and determining, based at least in part on the second time being within a threshold time period of the first time, that the request is valid.

AK: The one or more non-transitory computer-readable media of either paragraph AI or paragraph AJ, wherein the vehicle enters the recovery mode at a first time, the operations further comprising: determining that a current time is equal to or greater than a threshold time period from the first time; and causing the vehicle to be controlled to a second stopped location based at least in part on the fault.

AL: The one or more non-transitory computer-readable media of any one of paragraphs AI-AK, the operations further comprising: receiving, from an operator of the vehicle at a first time, a first input associated with disarming the recovery mode; receiving, from the operator of the vehicle at a second time after the first time, a second input associated with deactivating the recovery mode; and based at least in part on the second time being within a threshold time period of the first time, causing the vehicle to be controlled to a second stopped location based at least in part on the fault.

AM: The one or more non-transitory computer-readable media of any one of paragraphs AI-AL, the operations further comprising: determining, based at least in part on the fault, a type of constraint on an operation of the vehicle; and at least one of: determining that the request is valid based on a determination that the type of constraint is associated with the recovery mode; or determining that the request is invalid based on a determination that the type of constraint is associated with a failure mode.

AN: The one or more non-transitory computer-readable media of paragraph AM, wherein the type of constraint comprises at least one of a speed; an acceleration; a turn radius; a vehicle trajectory; a direction of travel of the vehicle; a drivetrain configuration of the vehicle; a mission of the vehicle; a voltage associated with an electric motor; or a passive collision response system.

AO: A system comprising: one or more processors; and memory storing processor-executable instructions that, when executed by the one or more processors, configure the system to: receive, from a controller associated with a set of components of a vehicle, at least one constraint associated with the set of components, the set of components being associated with an autonomous operation of the vehicle and the at least one constraint comprising a limitation on a parameter corresponding to propelling the vehicle; determine that the vehicle is currently operating in a manually assisted mode of operation; and perform at least one of: based on a determination that the at least one constraint is not associated with the manually assisted mode of operation, withhold data associated with the at least one constraint from a component control determination; or based on a determination that the at least one constraint is associated with the manual mode, send a control signal to limit operation of a component of the vehicle that is associated with the at least one constraint.

AP: The system of paragraph AO, wherein the at least one constraint is associated with the manual mode, and wherein the instructions further configure the system to: receive, via a computing device associated with the vehicle, an input from an operator comprising an override of the at least one constraint; and based at least in part on the input, withholding the control signal from the component.

AQ: The system of either paragraph AO or paragraph AP, wherein the instructions further configure the system to: receive, from the controller, diagnostics associated with an operation of the component; and validate the at least one constraint based at least in part on the diagnostics, wherein sending the control signal to the component is based at least in part on a validation of the at least one constraint.

AR: The system of any one of paragraphs AO-AQ, wherein the instructions further configure the system to: based at least in part on the determination that the at least one constraint is associated with the manually assisted mode of operation, cause an indication of the at least one constraint to be presented on a display of a computing device associated with the vehicle, wherein the indication is configured to inform an operator of the vehicle of the at least one constraint.

AS: The system of any one of paragraphs AO-AR, wherein the instructions further configure the system to: receive second data associated with a second set of components of the vehicle; determine, based at least in part on the second data, a second constraint associated with the function of the vehicle; identify a second component of the second set of components that is associated with the second constraint; and send a second control signal to the second component to limit an operation of the second component based at least in part on the second constraint.

AT: A method comprising: receiving, from a controller associated with a set of components of a vehicle, data comprising a constraint associated with the set of components, the set of components being associated with an autonomous operation of the vehicle and the constraint comprising a limitation on a parameter associated with a function of the vehicle; determine that the vehicle is currently operating in a manually assisted mode of operation; and based at least in part on a determination that the constraint is associated with the manually assisted mode of operation, sending a control signal to limit operation of a component of the vehicle based at least in part on the constraint.

AU: The method of paragraph AT, further comprising: receiving, from the controller, second data comprising a second constraint associated with the set of components; and based on a determination that the second constraint is not associated with the manually assisted mode of operation, withhold data associated with the second constraint from a component control determination.

AV: The method of either paragraph AT or paragraph AU, further comprising: receiving, via a computing device associated with the vehicle, an input from an operator comprising an override of the constraint; and based at least in part on the input, withholding the control signal from the component of the vehicle.

AW: The method of any one of paragraphs AT-AV, further comprising: receiving, from a computing device associated with the vehicle, a request from an operator of the vehicle to override the constraint; determining that the constraint is associated with a type of constraint that is not authorized to be overridden by the operator; based at least in part on a determination that the constraint is associated with the type of constraint, continuing to control the function of the component; and causing an indication of denial of the request to be presented to the operator on a display of the computing device.

AX: The method of paragraph any one of paragraphs AT-AW, further comprising: receiving, from a computing device associated with the vehicle, a request from an operator of the vehicle to engage an autonomous mode of the vehicle; determining, based at least in part on the constraint, that the set of components is not configured for the autonomous mode; and causing an indication of denial of the request to be presented to the operator on a display of the computing device.

AY: The method of any one of paragraphs AT-AX, further comprising: receiving, from the controller, a diagnostic associated with a performance of the component; and validating the constraint based at least in part on the diagnostics, wherein controlling the operation of the component is based at least in part on a validation of the constraint.

AZ: The method of any one of paragraphs AT-AY, further comprising: receiving, from the controller, a diagnostic associated with a performance of the component; and causing an indication of at least one of the constraint or the diagnostics to be presented on a display of a computing device associated with the vehicle.

BA: The method of any one of paragraphs AT-AZ, further comprising: receiving second data associated with a second set of components of the vehicle; determining, based at least in part on the second data, a second constraint associated with vehicular operation; identifying a second component of the second set of components that is associated with the second constraint; and sending a second control signal to the second component to limit an operation of the second component based at least in part on the second constraint.

BB: The method of any one of paragraphs AT-BA, further comprising: determining that the second constraint comprises a safety-related constraint associated with the function of the vehicle; and causing an indication of the safety-related constraint to be presented on a display of a computing device associated with the vehicle, wherein the indication provides data associated with the second constraint to an operator of the vehicle.

BC: One or more non-transitory computer-readable media storing instructions that, when executed, cause one or more processors to perform operations comprising: receiving, from a controller associated with a set of components of a vehicle, data comprising a constraint associated with the set of components, the set of components being associated with an autonomous operation of the vehicle and the constraint comprising a limitation on a parameter associated with a function of the vehicle; determine that the vehicle is currently operating in a manually assisted mode of operation; and based at least in part on a determination that the constraint is associated with the manual mode, send a control signal to limit operation of a component of the vehicle based at least in part on the constraint.

BD: The one or more non-transitory computer-readable media of paragraph BC, the operations further comprising: receiving, from the controller, second data comprising a second constraint associated with the set of components; and based on a determination that the second constraint is not associated with the manually assisted mode of operation, withhold data associated with the second constraint from a component control determination.

BE: The one or more non-transitory computer-readable media of either paragraph BC or paragraph BD, the operations further comprising: receiving, via a computing device associated with the vehicle, an input from an operator comprising an override of the constraint; and based at least in part on the input, withholding the control signal from the component of the vehicle.

BF: The one or more non-transitory computer-readable media of any one of paragraphs BC-BE, the operations further comprising: receiving, via a computing device associated with the vehicle, a request from an operator of the vehicle to override the constraint; determining that the constraint is associated with a type of constraint that is not authorized to be overridden by the operator; based at least in part on a determination that the constraint is associated with the type of constraint, continuing to control the operation of the component; and causing an indication of denial of the request to be presented to the operator on a display of the computing device.

BG: The one or more non-transitory computer-readable media of any one of paragraphs BC-BF, the operations further comprising: receiving, from the controller, a diagnostic associated with a performance of the component; and validating the constraint based at least in part on the diagnostics, wherein sending the control signal is based at least in part on a validation of the constraint.

BH: The one or more non-transitory computer-readable media of any one of paragraphs BC-BG, the operations further comprising: receiving, from the controller, a diagnostic associated with a performance of the component; and causing an indication of at least one of the constraint or the diagnostics to be presented on a display of a computing device associated with the vehicle.

While the example clauses described above are described with respect to one particular implementation, it should be understood that, in the context of this document, the content of the example clauses may also be implemented via a method, device, system, a computer-readable medium, and/or another implementation. Additionally, any of examples A-BH may be implemented alone or in combination with any other one or more of the examples A-BH.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   memory storing processor-executable instructions that, when executed by the one or more processors, configure the system to:
   receive, during an operation of a vehicle in a normal mode, data associated with a fault of a component of the vehicle;
   based at least in part on the fault of the component, controlling the vehicle to a stopped location, wherein the stopped location is associated with preventing the vehicle from moving;
   receive a request to enter a recovery mode associated with the operation of the vehicle, wherein the recovery mode comprises at least one parameter that is different from the normal mode and the recovery mode enables the vehicle to move under its own power;
   determine that at least one of the component or the fault is associated with the recovery mode;
   determine that the request is valid based at least in part on a determination that the at least one of the component or the fault is associated with the recovery mode; and
   based at least in part on the determination that the request is valid, cause the vehicle to be controlled according to the recovery mode.

2. The system of claim 1, wherein the processor-executable instructions further configure the system to:
   receive, from an operator of the vehicle at a first time, a first input associated with arming the recovery mode;

receive, from the operator of the vehicle at a second time after the first time, a second input associated with activating the recovery mode; and determine, based at least in part on the second time being within a threshold time period of the first time, that the request is valid.

3. The system of claim 1, wherein the vehicle enters the recovery mode at a first time and the processor-executable instructions further configure the system to:

determine that a current time is equal to or greater than a threshold period from the first time; and cause the vehicle to be controlled to a second stopped location according to the normal mode.

4. The system of claim 1, wherein the processor-executable instructions further configure the system to:

receive, from an operator of the vehicle at a first time, a first input associated with disarming the recovery mode;

receive, from the operator of the vehicle at a second time after the first time, a second input associated with deactivating the recovery mode; and based at least in part on the second time being within a threshold time period of the first time, cause the vehicle to be controlled to a second stopped location based at least in part on the fault.

5. The system of claim 1, wherein causing the vehicle to be controlled according to the recovery mode comprises at least one of:

enabling operation of the vehicle by an operator within parameters of the recovery mode; or controlling the vehicle according to the parameters of the recovery mode.

6. A method comprising:

receiving data associated with a fault of a component of a vehicle operating in an environment;

based at least in part on the fault of the component, controlling the vehicle to a stopped location, wherein the stopped location is associated with ceasing self-propelled movement of the vehicle in the environment;

receiving a request to enter a recovery mode associated with a continued operation of the vehicle;

determining that at least one of the component or the fault is associated with the recovery mode;

determining that the request is valid based at least in part by determining that the at least one of the component or the fault is associated with the recovery mode;

based at least in part on a determination that the request to enter the recovery mode is valid, controlling the vehicle according to the recovery mode.

7. The method of claim 6, further comprising:

receiving, from an operator of the vehicle at a first time, a first input associated with arming the recovery mode;

receiving, from the operator of the vehicle at a second time after the first time, a second input associated with activating the recovery mode; and determining, based at least in part on the second time being within a threshold time period of the first time, that the request is valid.

8. The method of claim 6, wherein the vehicle enters the recovery mode at a first time, the method further comprising:

determining that a current time is equal to or greater than a threshold time period from the first time; and causing the vehicle to be controlled to a second stopped location according to a normal mode.

9. The method of claim 8, further comprising:

receiving, at the second stopped location, a second request to enter the recovery mode, the second request comprising:

a first input associated with arming the recovery mode; and a second input associated with activating the recovery mode;

based at least in part on a determination that a time period between the first input and the second input meets or exceeds the threshold time period, determining that the second request is invalid; and based at least in part on determining that the second request is invalid, causing the vehicle to maintain the second stopped location.

10. The method of claim 6, further comprising:

receiving, from an operator of the vehicle at a first time, a first input associated with disarming the recovery mode;

receiving, from the operator of the vehicle at a second time after the first time, a second input associated with deactivating the recovery mode; and based at least in part on the second time being within a threshold time period of the first time, causing the vehicle to be controlled to a second stopped location according to a normal mode of operation.

11. The method of claim 6, further comprising:

while the vehicle is operating in the recovery mode, identifying a second fault associated with a second component of the vehicle;

determining that a constraint associated with the second fault is associated with a normal mode; and withholding data associated with the constraint from vehicle control considerations associated with the recovery mode.

12. The method of claim 6, further comprising:

determining, based at least in part on the fault, a type of constraint on an operation of the vehicle; and at least one of:

determining that the request is valid based on a determination that the type of constraint is associated with the recovery mode; or determining that the request is invalid based on a determination that the type of constraint is associated with a failure mode.

13. The method of claim 12, wherein the type of constraint comprises at least one of:

a speed;

an acceleration;

a turn radius;

a vehicle trajectory;

a direction of travel of the vehicle;

a drivetrain configuration of the vehicle;

a mission of the vehicle;

a voltage associated with an electric motor; or a passive collision response system.

14. One or more non-transitory computer-readable media storing instructions that, when executed, cause one or more processors to perform operations comprising:

receiving data associated with a fault of a component of a vehicle operating in an environment;

based at least in part on the fault of the component, controlling the vehicle to a stopped location, wherein the stopped location is associated with ceasing the operations of the vehicle in the environment receiving a request to enter a recovery mode associated with a continued operation of the vehicle;

determining that at least one of the component or the fault is associated with the recovery mode;
determining that the request is valid based at least in part by determining that the at least one of the component or the fault is associated with the recovery mode; and
based at least in part on a determination that the request to enter the recovery mode is valid, controlling the vehicle according to the recovery mode.

15. The one or more non-transitory computer-readable media of claim 14, the operations further comprising:
receiving, from an operator of the vehicle at a first time, a first input associated with arming the recovery mode;
receiving, from the operator of the vehicle at a second time after the first time, a second input associated with activating the recovery mode; and
determining, based at least in part on the second time being within a threshold time period of the first time, that the request is valid.

16. The one or more non-transitory computer-readable media of claim 14, wherein the vehicle enters the recovery mode at a first time, the operations further comprising:
determining that a current time is equal to or greater than a threshold time period from the first time; and
causing the vehicle to be controlled to a second stopped location based at least in part on the fault.

17. The one or more non-transitory computer-readable media of claim 14, the operations further comprising:
receiving, from an operator of the vehicle at a first time, a first input associated with disarming the recovery mode;
receiving, from the operator of the vehicle at a second time after the first time, a second input associated with deactivating the recovery mode; and
based at least in part on the second time being within a threshold time period of the first time, causing the vehicle to be controlled to a second stopped location based at least in part on the fault.

18. The one or more non-transitory computer-readable media of claim 14, the operations further comprising:
determining, based at least in part on the fault, a type of constraint on an operation of the vehicle; and
at least one of:
determining that the request is valid based on a determination that the type of constraint is associated with the recovery mode; or
determining that the request is invalid based on a determination that the type of constraint is associated with a failure mode.

19. The one or more non-transitory computer-readable media of claim 18, wherein the type of constraint comprises at least one of:
a speed;
an acceleration;
a turn radius;
a vehicle trajectory;
a direction of travel of the vehicle;
a drivetrain configuration of the vehicle;
a mission of the vehicle;
a voltage associated with an electric motor; or
a passive collision response system.

20. The one or more non-transitory computer-readable media of claim 14, the operations further comprising:
while the vehicle is operating in the recovery mode, identifying a second fault associated with a second component of the vehicle;
determining that a constraint associated with the second fault is associated with a normal mode; and
withholding data associated with the constraint from vehicle control considerations associated with the recovery mode.

* * * * *